United States Patent
Evans et al.

(10) Patent No.: US 9,247,316 B2
(45) Date of Patent: Jan. 26, 2016

(54) PROTECTED MEDIA DECODING USING A SECURE OPERATING SYSTEM

(71) Applicant: Microsoft Corporation, Redmond, WA (US)

(72) Inventors: Glenn F. Evans, Kirkland, WA (US); Shyam Sadhwani, Bellevue, WA (US); Yongjun Wu, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 57 days.

(21) Appl. No.: 13/868,981

(22) Filed: Apr. 23, 2013

(65) Prior Publication Data

US 2014/0314233 A1 Oct. 23, 2014

(51) Int. Cl.
| | | |
|---|---|---|
| H04N 21/2347 | (2011.01) | |
| H04N 21/83 | (2011.01) | |
| G06F 21/10 | (2013.01) | |
| H04N 21/4405 | (2011.01) | |
| H04N 21/443 | (2011.01) | |
| H04N 21/4627 | (2011.01) | |
| H04N 21/241 | (2011.01) | |

(52) U.S. Cl.
CPC ............... *H04N 21/83* (2013.01); *G06F 21/10* (2013.01); *H04N 21/443* (2013.01); *H04N 21/44055* (2013.01); *H04N 21/4627* (2013.01); *G06F 2221/0735* (2013.01); *H04N 21/23476* (2013.01); *H04N 21/241* (2013.01)

(58) Field of Classification Search
CPC ............................ H04N 21/2347; H04N 7/167
USPC .................................................... 380/210
See application file for complete search history.

(56) References Cited

U.S. PATENT DOCUMENTS

| | | | | |
|---|---|---|---|---|
| 6,985,591 | B2 * | 1/2006 | Graunke | 380/277 |
| 7,665,143 | B2 | 2/2010 | Havens et al. | |
| 7,752,674 | B2 * | 7/2010 | Evans et al. | 726/26 |

(Continued)

FOREIGN PATENT DOCUMENTS

EP    1387238    2/2004

OTHER PUBLICATIONS

International Search Report and Written Opinion dated Dec. 17, 2013, from International Patent Application No. PCT/US2013/058831, 7 pp.

(Continued)

*Primary Examiner* — Teshome Hailu
*Assistant Examiner* — Thanh Le
(74) *Attorney, Agent, or Firm* — Sunah Lee; Judy Yee; Micky Minhas

(57) ABSTRACT

Disclosed herein are representative embodiments of tools and techniques for facilitating decoding of protected media information using a secure operating system. According to one exemplary technique, encoded media information that is encrypted is received at a secure process of a secure operating system of a computing system. At least a portion of the encoded media information that is encrypted is decrypted in the secure process. The portion of the encoded media information includes header information. Additionally, the header information is sent from the secure operating system to a software decoder for control of decoding hardware. The software decoder is included in a process for an application. Also, the decoding hardware is securely provided access to the encoded media information for decoding of the encoded media information to produce decoded media information.

31 Claims, 15 Drawing Sheets

(56) References Cited

U.S. PATENT DOCUMENTS

| | | | |
|---|---|---|---|
| 7,978,848 B2 | 7/2011 | Zhu et al. | |
| 8,280,051 B2* | 10/2012 | Malcolm et al. | 380/212 |
| 8,457,311 B1* | 6/2013 | Schultz et al. | 380/210 |
| 8,532,290 B2 | 9/2013 | Zollinger et al. | |
| 8,625,788 B2 | 1/2014 | Pendakur et al. | |
| 8,688,991 B1* | 4/2014 | Sunil | 713/176 |
| 8,724,696 B2 | 5/2014 | Byford et al. | |
| 8,768,078 B2* | 7/2014 | Neubrand | 382/233 |
| 2003/0154295 A1 | 8/2003 | Mangold | |
| 2004/0139335 A1* | 7/2004 | Diamand et al. | 713/189 |
| 2005/0078944 A1 | 4/2005 | Risan et al. | |
| 2008/0063196 A1 | 3/2008 | Evans et al. | |
| 2009/0323826 A1 | 12/2009 | Wu et al. | |
| 2010/0172630 A1 | 7/2010 | Chou et al. | |
| 2012/0102307 A1 | 4/2012 | Wong | |
| 2012/0176546 A1 | 7/2012 | Yoon | |
| 2012/0284804 A1 | 11/2012 | Lindquist et al. | |
| 2013/0202109 A1 | 8/2013 | Ducharme | |
| 2014/0052873 A1 | 2/2014 | Watson et al. | |
| 2014/0075582 A1 | 3/2014 | Hierro et al. | |
| 2014/0208441 A1 | 7/2014 | Rantala | |

OTHER PUBLICATIONS

Sullivan, Gary J., "DirectX Video Acceleration Specification for H.264/AVC Decoding," Published on: Dec. 2007, Available at: http://download.microsoft.com/download/5/f/c/5fc4ec5c-bd8c-4624-8034-319c1bab7671/DXVA_H264.pdf.

"H.264 Video Types," http://msdn.microsoft.com/en-us/library/windows/desktop/dd757808(v=vs.85).aspx, 3 pages (accessed Apr. 3, 2013).

Arm, "TrustZone," downloaded from the World Wide Web on Aug. 10, 2014, 11 pp. (document not dated).

Brightcove Inc., "Protecting Your Content using Google Widevine," downloaded from the World Wide Web on Aug. 7, 2014, 5 pp. (document not dated).

Discretix Technologies Ltd., "Hardware Assisted DRM & Link Protection," downloaded from the World Wide Web on Aug. 6, 2014, 5 pp. (document marked 2013).

Microsoft Corporation, "Protected Media Path," downloaded from the World Wide Web on Dec. 15, 2014, 5 pp. (document not dated).

Wikipedia, "Media Foundation," downloaded from the World Wide Web on Dec. 15, 2014, 6 pp. (document marked "last modified on Nov. 26, 2014").

\* cited by examiner

SOFTWARE 1580 IMPLEMENTING PROTECTED MEDIA DECODING
USING A SECURE OS

PROTECTED MEDIA DECODING USING A SECURE OPERATING SYSTEM

BACKGROUND

As the use of digital video has become more prevalent, various device or digital rights management (DRM) systems have been developed to protect video content. Some traditional DRM systems have been developed to use media pipelines which decode video content protected with an encryption. These traditional DRM systems have media pipelines with processing components that decrypt encrypted compressed video content and other processing components with complex software code for parsing the compressed video content. Although these traditional DRM systems have been developed to protect video content, these traditional DRM systems have limitations.

SUMMARY

Among other innovations described herein, this disclosure presents various respective embodiments of tools and techniques for using a secure operating system in protecting media information during decoding and/or outputting. According to one exemplary technique, encoded media information that is encrypted is received at a secure process of a secure operating system of a computing system. At least a portion of the encoded media information that is encrypted is decrypted in the secure process. The portion of the encoded media information includes header information. For example, the header information can include a constrained amount of data of the total data for the encoded media information. Additionally, the header information is sent from the secure operating system to a software decoder for control of decoding hardware. The software decoder is included in a process for an application. Also, the decoding hardware is securely provided access to the encoded media information for decoding of the encoded media information to produce decoded media information.

According to an exemplary tool, a decryption key and encoded media information that is encrypted are received at a secure process of a secure operating system. Header information that is included in the encoded media information that is encrypted is decrypted by the secure process using the decryption key. The header information is sent from the secure operating system to a software decoder for control of decoding hardware. The software decoder is included in a process for an application. Additionally, the decoding hardware is securely provided the decryption key from the secure operating system to facilitate decryption of the encoded media information that is encrypted and decoding of the decrypted encoded media information to produce decoded media information.

According to another exemplary technique, encoded media information which is at least partially encrypted is received at a secure process of a secure operating system. The encoded media information includes header information which is not encrypted. The header information is sent from the secure operating system to a software decoder for control of decoding hardware. Additionally, the decoding hardware is securely provided access to at least an encrypted portion of the encoded media information which is at least partially encrypted for decoding of the encoded media information which is at least partially encrypted to produce decoded media information.

This summary is provided to introduce a selection of concepts in a simplified form that are further described below. This summary is not intended to identify key features or essential features of the claimed subject matter, nor is it intended to be used to limit the scope of the claimed subject matter. The foregoing and other objects, features, and advantages of the technologies will become more apparent from the following detailed description, which proceeds with reference to the accompanying figures.

DETAILED DESCRIPTION

Figure 1:
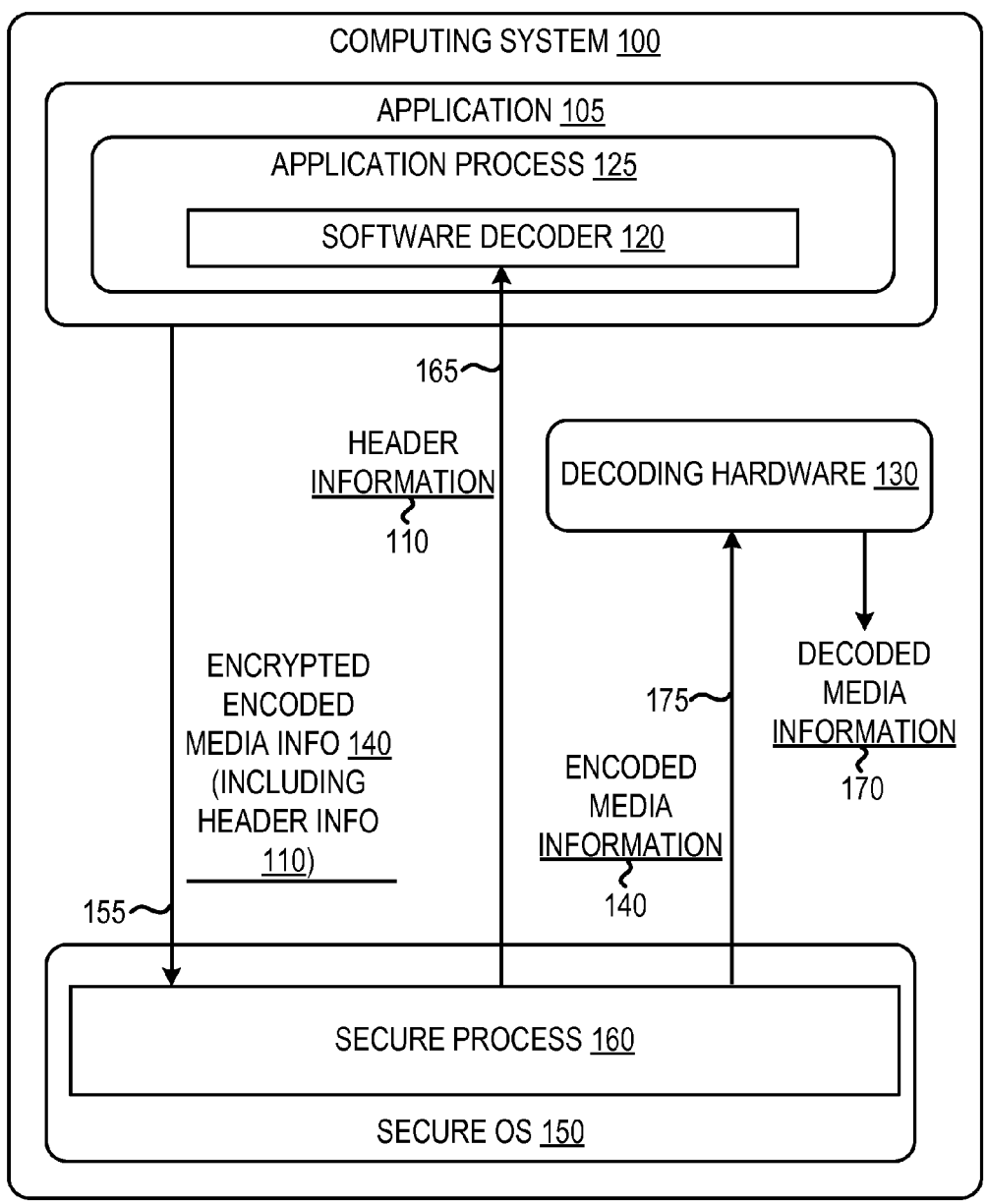
FIG. 1 is a diagram illustrating an exemplary computing system for decoding media information at least by sending header information to a software decoder and securely providing decoding hardware access to encoded media information using a secure operating system.

This disclosure presents various representative embodiments of tools and techniques for using a secure operating system in protecting media information during decoding and/or outputting. The use of a secure operating system (OS) can provide an increased level of protection to a device or digital rights management (DRM) system, as the secure OS can be used at least to protect sensitive information used in a media pipeline of a computing system. For example, with a secure OS, a secure decrypter can expose a constrained amount of data that includes header information from encrypted media information while maintaining at least a portion of non-header information in encrypted form. For example, the header information can include a small portion of the total data included in the media information. In some implementations, the header information included in the encoded media information is unencrypted when received by the secure OS and the unencrypted portion of the header information can be extracted and/or copied by a header parser. The header information can include one or more of a sequence parameter set (SPS), a picture parameter set (PPS), a slice header, or other like header information provided according to any of one or more compression formats. For example, a compression format can include a video compression format such as H.264/AVC, SMPTE VC-1, MPEG-2, MPEG-4 Pt2, HEVC/H.265, or the like. The constrained amount of data can also include other control information that can be derived from the bitstream, such as a type of data (e.g., video, audio, or other type of data) or the like. The header information can be included in encoded media information that is received at the secure OS. Also the secure OS can receive a description of the encoded media information that indicates a type such as video, audio or the like. The description of the encoded media information can be securely encoded and included in media policy data passed to the secure OS. For example, the media policy data can be included in a signed policy certificate received at the secure OS. The exposed header information can be passed out of the secure OS to a software decoder of an application. Enough header data is sent to the application process to allow a software decoder to at least perform control processing such as media pipeline interfacing, timing functions, decoding hardware control, or the like. The computing system can include more than one operating system such that the application can be managed by an operating system which is different than the secure operating system.

By limiting involvement of the complex functionality of the software decoder within the application's process the complex functionality of the software decoder that can be attacked (e.g., via buffer overruns, or the like) can be prevented from being present in the secure OS. By limiting involvement of the complex functionality of the software decoder within the application's process the media information can be better protected through the media pipeline. For example, complex code such as software decoders which perform complex parsing can be vulnerable to attacks focused on exposing media information protected through encryption so that media information can be stolen in a decrypted form. By allowing the software decoder access to only a header portion of the encrypted media information, the inaccessible remaining portion of the encrypted media information can be protected. After the header portion is decrypted, access to the encrypted encoded media information or the remaining encrypted portion thereof can be securely provided by the secure OS to decoding hardware for decrypting and/or decoding (e.g., decompressing). As a secure decrypter of a secure OS can be implemented using software code, the use of the secure OS to protect media information can be adapted for use with one or more of various hardware configurations. In some implementations, the secure decrypter can provide transcription of data encrypted in a first encryption format to the data encrypted in a lighter second encryption format. The extracted portion of the encoded media information sent to the software decoder from the secure decrypter, in some implementations, can be re-encrypted using a cheaper encryption scheme based on session keys. The transcription of information into a second encryption format provided by the secure decrypter can protect lower value data and/or can be used to validate one or more software components to protect against unintentional leaks of data.

In various examples described herein, encoded media information, keys and other information are sent and received within a computing system. As used herein, the terms "send" and "receive" generally indicate any form of delivery of the information within a computing system. The terms "send" and "receive" do not imply any limitation on the manner or mechanism of communication within the computing system. Depending on implementation and practical considerations (e.g., amount of information, security), the "send" and "receive" operations can be implemented by passing of information by value as one or more parameters of a method call, as messages, as events, etc., by passing of information by reference (as a location in memory) or through any other form of communication within the computing system. The information that is conveyed from "sender" to "receiver" can be directly conveyed or processed through one or more intervening layers of code, potentially including processing that changes the type, structure, fields, etc. of the information, or converts the information to another form.

Exemplary System for Decoding that Sends Header Information to a Software Decoder and Securely Provides Decoding Hardware Access to Encoded Media Information Using a Secure Operating System FIG. 1 is a diagram illustrating an exemplary computing system 100 for decoding protected media information at least by sending header information 110 to a software decoder 120 and securely providing decoding hardware 130 access to encoded media information 140 using a secure operating system (OS) 150. In FIG. 1, encoded media information 140 is received at a secure process 160 of the secure OS 150 as illustrated at 155. The encoded media information 140 is encrypted when received by the secure process from the application 105 or another source. The encryption of the encoded media information 140 can provide security and/or protection to the encoded media information during transmission and/or processing.

The encoded media information 140 includes header information 110. The header information 110 can include a small portion of the total data included in the encoded media information 140. The secure process 160 decrypts at least a portion of the received encoded media information 140 that includes the header information 110 and extracts the header information 110 to send (165) the header information 110 to the software decoder 120. In some implementations, at least a portion of the header information can be unencrypted when received by the secure process 160 and at least the unencrypted portion of the header information is extracted for sending to the software decoder 120. In some implementations, the information sent to the software decoder 120 from the secure OS 150 can be encrypted using a cheaper cost encryption scheme to further mitigate leaks from the secure OS 150. The software decoder 120 can use control information included in the header information 110 at least for controlling the decoding hardware 130. The secure process 160 can extract header information that includes enough control information at least so that the software decoder 120 can control the media pipeline that includes both the software decoder 120 and the decoding hardware 130. By exposing the software decoder 120 to the decrypted header information 110, the remaining encrypted portion of the encoded media information 140 can be protected by the encryption and not exposed to the software decoder 120 in an unencrypted form. For example, the media pipeline of the application 105 can be implemented at least by adapting a Direct X Video Acceleration (DXVA) decoding pipeline. In some implementations, information about the received content stream (e.g., the encoded media information) can be received at the secure OS 150. The information about the received content stream can include information about an encoding format (e.g., video compression format, audio compression format, or the like) of the encoded media information, a codec, a media type or other information about the content stream. The information about the received content stream can be used to authenticate one or more components within the secure OS 150. In some implementations, the information about the content stream can be received at the secure OS 150 included in a signed policy certificate. In some implementations, the secure OS 150 can receive one or more decryption keys that can be used to decrypt the encryption of the received encoded media information 140. In some implementations, in addition to sending the header information 110 to the software decoder 120, the secure process sends a media type for the encoded media information 140.

The software decoder 120 is included in an application process 125 of an application 105 executed by the computing system 100. At 175, access to the encoded media information 140 is securely provided to the decoding hardware 130. The decoding hardware 130 decodes the encoded media information 140 to produce decoded media information 170. At least by passing the decrypted header information 110 to the software decoder 120, the complex parsing and/or generation of the control information by the software decoder 120 can be maintained in the application process 125 and not included in the secure OS 150.

Figure 2:
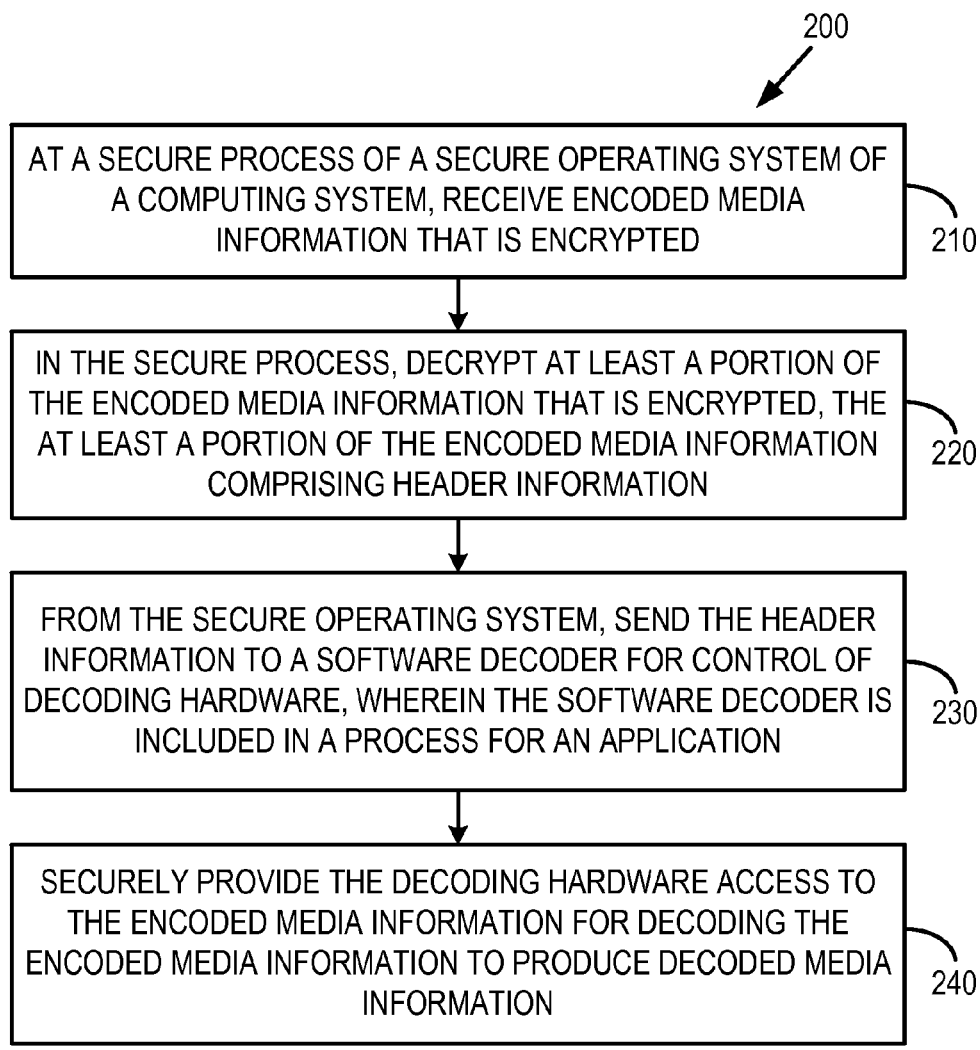
FIG. 2 is a flow diagram illustrating an exemplary method for decoding at least by sending header information to a software decoder and securely providing decoding hardware access to encoded media information using a secure operating system.

Exemplary Method for Decoding at Least by Sending Header Information to a Software Decoder and Securely Providing Decoding Hardware Access to Encoded Media Information Using a Secure Operating System FIG. 2 is a flow diagram illustrating an exemplary method 200 for decoding at least by sending header information to a software decoder and securely providing decoding hardware access to encoded media information using a secure operating system (secure OS). In FIG. 2, encoded media information that is encrypted is received at a secure process of a secure operating system of a computing system at 210. For example, the encrypted media information can be received securely from an application of the computing system. In some implementations, the encrypted encoded media information is received at a secure decrypter of the secure process.

The encoded media information can be sent encrypted by a content source and/or provider to protect the encoded media information. In some implementations, a content source can be a computer readable media (e.g., a media disk or the like) or a media content server (e.g., in the cloud or elsewhere) that provides content to the application and/or secure OS. For example, content can include one or more of media information, a signed policy certificate, a media information policy, a decryption key, or the like. The content source can send the encrypted encoded media information to be received at the secure OS through an application of the computing system. In some implementations, at least a portion of the header information included in the encoded media information can be unencrypted when received by the secure process. In some implementations, the secure process receives a decryption key sent from the content source that can be used to decrypt the encrypted encoded media information. In some implementations, the secure process can receive a signed policy certificate sent from the content source that is associated with the encrypted encoded media information received. A decryption pass-through mode can be established so that an input trust authority of the application process can pass the decryption key (e.g., through a secure channel or the like) and the encrypted content downstream to a secure decrypter of the secure OS.

In some implementations, media information can include information for one or more digital media such as digital video, audio, or the like. The media information can be encoded using one or more formats. In some implementations the formats include compression formats and/or formats for transmission of the media information. In some implementations, the media information can be encrypted. The media information can be encrypted in an encoded format and/or in a decoded format. In some implementations, the encoded media information and/or a description of the encoded media information can be used to verify that an appropriate software decoder and/or hardware decode offload algorithm is used in the media pipeline and/or decoding of the encoded media information.

In some implementations, the encoded media information can be content that is stored in one or more media container formats. A container format can include MP4, fragmented MP4, Advanced Systems Format (ASF), frame level containers, or the like. In some implementations, where the media information is video data, the video data can be packaged in units of a frame. In some implementations, the encrypted media information can be in a streaming protocol format that can support frame-level-based samples. For example, a streaming protocol format can include Internet Information Services Smooth Streaming or the like. In some implementations, the encrypted media information can be in a streaming container format such as MPEG2TS, DTCPIP, MPEG DASH/TS, or other like streaming container formats. When the encrypted media information is in a streaming container format, a header parser and/or the secure decrypter can be adapted to determine clear region offsets to determine the location and/or size of header information located in the encoded media information to be passed to a software decoder. In some implementations, when the encrypted media information is in a streaming container format, a container that includes media information can be parsed to demultiplex the streams. In some implementations, the media information can be encoded in one or more compression formats including H.264, Windows Media Video™ (WMV), VC-1, MPEG or other like media compression formats.

At 220 of FIG. 2, at least a portion of the encoded media information that is encrypted is decrypted in the secure process. At least the portion of the encoded media information that is decrypted includes the header information of the encoded media information. For example, a portion of the encoded media information can be decrypted and the decrypted portion can include header information. In some implementations, the header information can comprise a small portion of the total data included in the encoded media information. The remaining portion of the encoded media information can remain encrypted. In some implementations, the secure decrypter can be implemented using software code (e.g., computer-executable instructions or the like). The secure decrypter can execute on a processor (e.g., CPU or other processor) that is executing the secure OS. In some implementations, the secure decrypter can receive a decryption key that can be used to decrypt the encoded media information that is encrypted. In some implementations, when at least a portion of the header information included in the encoded media information is unencrypted when received by the secure process, at least the unencrypted portion of the header information is extracted by a header parser for sending to a software decoder. For example, the secure decrypter of the secure OS does not decrypt the header information that is received unencrypted, and a header parser can extract the header information.

In some implementations, the secure decrypter determines what portion of the encrypted encoded media information includes the header information. For example, the secure decrypter can include a header parser that can determine the location of one or more headers at least by parsing one or more start codes of the encoded media information. In some implementations, the header parser can determine the length of one or more headers at least through parsing a portion of the encoded media information that has been decoded. The header parser can determine the length of a header based on information included in one or more headers such as a header type or indicated header size and/or length. In some implementations, the header parser can check the header against a table of known lengths and copy up to the end of the header or the cap amount of data determined for the encoding format.

In some implementations, the secure process can also receive a description of the encoded media information that indicates its encoding format such as a video format, audio format, or the like. The description of the encoded media information can be used by a secure decrypter of the secure OS to validate that the header parser is extracting information according to the encoding format indicated by the received description of the encoded media information. The description of the encoded media information can be securely encoded and included in media policy data passed to the secure OS. For example, the media policy data can be included in a signed policy certificate received at the secure OS. In some implementations, from information included in a signed policy certificate, the secure decrypter can select a decryption key that can be used to decrypt the encoded media information that is encrypted.

In some implementations, the secure decrypter can decrypt a cap amount of the encrypted media information. The cap amount of data can be set to an amount of data that is to include the header information based on the encoding format used to encode the media information. For example, the cap amount of data can be set to an amount of data that includes the header information for the encoded media information as decrypted and does not include at least a portion of non-header information included in the encoded media information. In some implementations, the cap amount of data can include the header information and other information (e.g., data) included in the encoded media information up to the cap amount of data. In some implementations, the portion of the encoded media information not included in the cap amount of data can include a portion of or all of a payload portion of the encoded media information. For example, the media information can include the header information portion and a payload portion (e.g., slice data and the like) and the cap amount of data can prevent a renderable amount of the payload portion from being decrypted and/or sent to a software decoder.

At 230 of FIG. 2, the header information is sent to a software decoder from the secure operating system for control of decoding hardware. The software decoder can be included in a process for an application. For example, the software decoder can be a component loaded in a process that is part of a media pipeline for the application. In some implementations, the header information is extracted from a decrypted portion of the encoded media information and sent to the software decoder. Protections of the application process can protect the header information within the application process. For example, the application process can include a protected application process that is a trusted process that can provide protections to the header information. In some implementations, a secure session based encryption channel (e.g., via RC4 or the like) can be established with the software decoder to pass information from the secure component of the secure OS to the software decoder to further protect the information from being stolen.

In some implementations, the header information is sent to the software decoder included in a portion of the encoded media information that was determined to include the header information. For example, the header information can be included in a cap amount of data that is decrypted and sent to the software decoder by the secure process. In some implementations, a copy of the decrypted portion of the media information up to a cap amount of data can be extracted from the encoded media information. In some implementations, the header parser can pass along a length of the decrypted header information along with the header information. For example, the length of the decrypted header information can be passed as metadata. In some implementations, the header parser of the secure decrypter can send a media type for the header information from the secure OS to the software decoder of the secure OS. In some implementations, a media type for the encoded media information can be included in policy information included in a signed policy certificate.

In some implementations, at least a portion of the non-header information of the encoded media information may be included in a cap amount of data sent to the software decoder; however, the cap amount of data can be set such that the leaked non-header information (e.g., slice data, picture data, or the like) is not enough information to render a significant part of the media (e.g., a video, a picture, or other media). By extracting the decrypted header information in the secure process to expose the decrypted header information to the software decoder, the remaining encrypted portion of the encoded media information can be protected through encryption and not exposed to the software decoder in an unencrypted form. With control information included in the header information, the software decoder can manage decoding functions. However, the software manager does not have access to all or substantially all of the remaining non-header portion of the media information (e.g., slice data or the like) when it is stored in a secure memory store and/or the software manager is not able to decrypt the remaining non-header portion of the media information when it is encrypted.

In some implementations, to send the header information to the software decoder, a header parser can extract the decrypted header information from the encoded media information, and then the header parser can put the extracted header information into a buffer allocated by the software decoder of the application for passing the header information to the software decoder. In some implementations, the header information can be passed to the application process and/or a software decoder by overwriting data in a buffer or memory that was provided to send the encoded media information to the secure OS. For example, a secure decrypter and/or header parser loaded in a secure process of the secure OS can pass header information to a software decoder by reusing buffers allocated by the application process that includes the software decoder. The secure decrypter and/or header parser can decrypt the header information in a buffer in which the encrypted encoded media information was provided to the secure decrypter. In some implementations, to pass a key index for a decryption key, along with overwriting encrypted data with the header information, the secure decrypter can overwrite some remaining encrypted data within the provided buffer with the key index. In other implementations, a key index can be passed from the secure OS to the application process using an established secure channel or other secure manner of passing data. The key index can include a reference to memory managed by the secure OS. For example, the key index can reference memory managed by the secure OS that can be used by decoding hardware.

The software decoder can do an in-depth parsing of one or more headers included in the header information of one or more frames. The software decoder can parse the received header information at least to extract control information. The control information can be used to control processing and/or decoding of the media information. In some implementations, the software decoder can use the header information at least for allocating enough memory for the decompressed media and/or for ordering the frames of the media. In some implementations, the control information can be used to control decoding hardware. For example, the control information can be used to determine decoding operation commands that can be sent to the decoding hardware to control the decoding hardware. In some implementations, the decoding operation commands can include one or more DXVA decoding operations. At least by passing the header information to the software decoder, the complex decoding functionality such as parsing and generation of the control information can remain in the application process.

At 240 in FIG. 2, the decoding hardware is provided access to the encoded media information for decoding to produce decoded media information. In some implementations, the decoding hardware is provided access to the encoded media information stored in a secure memory of the secure OS. For example, the decoding hardware can be securely provided a location in the secure memory store where the encoded media information is stored, and the decoding hardware can access the secure memory store as a trusted component to retrieve the encoded media information. In some implementations, the encoded media information is stored unencrypted in the secure memory store. In another implementation, the encoded media information is stored encrypted in the secure memory store of the secure OS. For example, the non-header information of the media information payload (e.g., the slice data, or the like) can be stored in the secure memory and later securely sent to the decoding hardware for decryption and decoding.

In some implementations, the decoding hardware is provided access to the encoded media information at least by securely providing a decryption key from the secure OS, through a secure channel, so that the decoding hardware can access the encoded media information by decrypting the encrypted encoded media information. For example, the secure decrypter can pass a decryption key such as an AES decryption key to the software decoder of the application process to pass to the decoding hardware through one or more hardware drivers such as a DXVA decoding interface for DXVA decoding hardware. In some implementations, in establishing the secure channel, a handshake can be done between the secure OS and the decoding hardware. For example, a DXVA decoding interface can be adapted for allowing for a secure channel to be established to pass a decryption key from the header parser of the secure decrypter to the decoding hardware. In some implementations, the secure OS can establish a secure channel to authenticate the decoding hardware. In some implementations, a secure link to a remote hardware can be established to pass information from a secure OS. For example, hardware (e.g., decoding hardware or other hardware) can be located remotely from the computing device that is running the secure OS, and the remote hardware can be accessible over a network environment. A secure link can be established from the secure OS to pass information over the network environment to the remote hardware. In some implementations, the secure OS decrypts the encrypted encoded media information using the received decryption key and re-encrypts the encoded media information so that the re-encrypted encoded media information can be decrypted using a different decryption key. The decryption key for decrypting the re-encrypted encoded media information can be securely passed to the decoding hardware at least to provide the decoding hardware access to the encoded media information that has been re-encrypted.

In another implementation, the decoding hardware is provided access to the encoded media information at least by securely providing a decryption key from a secure key store of the secure OS. For example, the decryption key is stored in a key store of the secure OS, and a key index for referencing the decryption key in the key store is sent to and received by the hardware decoder. The decoding hardware can be a trusted component that can access the secure key store, and using the key index the decryption key can be referenced and then passed to the decoding hardware from the secure key store. In some implementations, the decoding hardware is trusted by the secure OS and as trusted hardware can be allowed by the secure OS to have read and/or write access to secure memory controlled by the secure OS.

Figure 3:
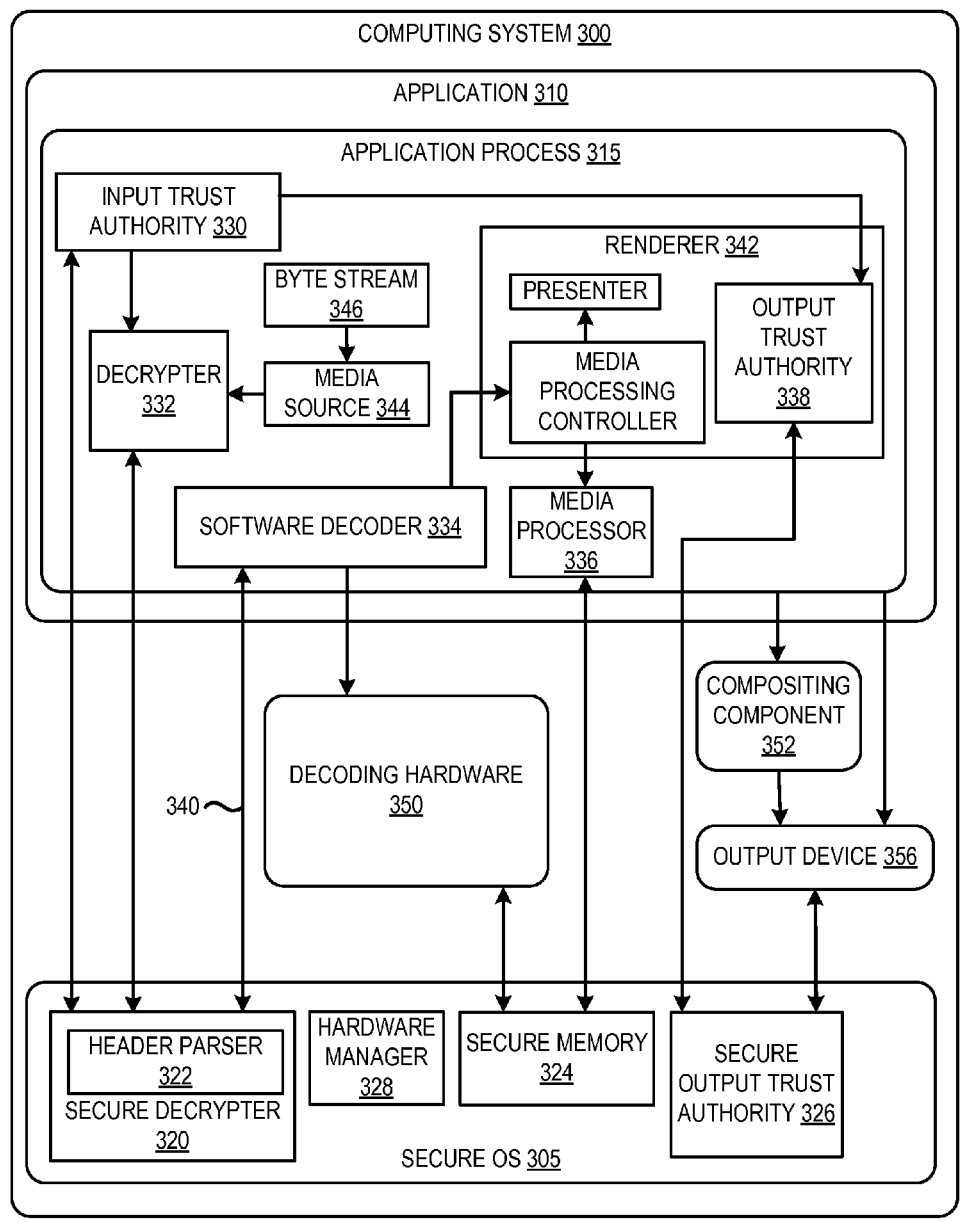
FIG. 3 is a schematic diagram illustrating an exemplary computing system for decoding protected media using a secure operating system.

Exemplary System for Decoding and Policy Enforcement of Protected Media Information Using a Secure OS FIG. 3 is a schematic diagram illustrating an exemplary computing system 300 for decoding protected media using a secure operating system 305. In FIG. 3, the computing system 300 includes one or more secure operating systems such as the secure OS 305. The exemplary computing system 300 includes one or more applications such as application 310.

The application 310 includes the application process 315. In some implementations the application process 315 can include an untrusted process and a protected process. The application process 315 can include a media pipeline, which is created by the application, which can decode and/or process media information. The media pipeline can own one or more pluggable components included in the media pipeline, and the media pipeline can at least pass information through the components for processing purposes. In creating an instance of the media pipeline for the application process, the application can load the appropriate components in the process for the designated encoding format of the media information. One or more components of the application process 315 can provide secure code to be loaded into the secure OS 305 to implement a corresponding secure component in a secure process of the secure OS 305. In some implementations, the secure OS can load appropriate components in its secure process based on one or more of the components loaded in the application process 315. For example, when a component is loaded in the application process 315, a secure component can be loaded in the secure OS 305 that proxies the component loaded in the application process 315. In some implementations, the application 310 can have proxy components loaded that communicate with components in a protected process for the application. For example, the application can have an untrusted process that includes proxy components which proxy digitally signed or otherwise protected components loaded in a trusted protected process used to create a media pipeline. In some implementations, when a component is loaded into a process and/or protected process of the application the component can be validated as being an authorized and/or protected component.

With reference to FIG. 3, the secure OS 305 can be any secure OS described herein. In some implementations, the secure OS can include one or more secure components loaded into a secure process of the secure OS. The secure components can be implemented with software code (e.g., one or more computer-executable instructions) that is signed with a digital signature. The digital signature can be used to verify that the component is implemented using code that is trusted as secure. The secure components of the secure OS 305 can include one or more of a secure decrypter 320, a header parser 322, a secure output trust authority 326, and a hardware manager 328. The secure OS 305 controls a secure memory store such as the secure memory 324.

The secure OS 305 can have a digital signature that can be used by a content source and/or provider to verify that the secure OS is trusted to be sent protected content such as encoded media information that is encrypted or other information. For example, a server (e.g., in the cloud or elsewhere) can be the content provider, and the server can use the digital signature of the secure OS 305 of the computing system 300 to verify that the secure OS 305 is trusted (e.g., a trusted client) and authorized to receive the encrypted encoded media information. In some implementations, the secure components that are loaded into the secure OS 305 can have digital signatures that can be used to verify the authenticity/validity of the secure OS 305 by the content provider or source for providing the secure OS 305 content.

The components of the secure OS 305, in some implementations, can be of lower complexity than their respective proxy components in the application process 315. At least by having a reduced complexity, the secure components can be made less vulnerable to traditional exploitation techniques aimed at circumventing protections provided by components of a media pipeline.

The secure OS 305 can be a different operating system than the operating system running the application 310 and/or the application process 315. In some implementations, the secure OS 305 can run on an independent processor (e.g., CPU) of the computing system 300. For example, the secure OS 305 can run on a processor that is not running the application process 315. In some implementations, the secure OS 305 can run on the same processor that is running the application process 315 but the secure OS 305 can be running in a different mode (e.g., a restricted mode) than the application process 315.

In FIG. 3, the secure process of the secure OS 305 includes a secure decrypter 320. The secure decrypter 320 can be any secure decrypter described herein. The secure decrypter 320 can decrypt encrypted media information. The secure decrypter 320 can decrypt all and/or a portion of the encrypted media information. For example, the secure decrypter 320 can decrypt header information included in encrypted encoded media information up to a cap amount of data set for the encrypted encoded media information. In some implementations, when at least a portion of the header information included in the encoded media information is unencrypted when received by the secure process, at least the unencrypted portion of the header information is extracted by the header parser 322 for sending to the software decoder 334. The secure decrypter 320 can pass information to the software decoder as shown at 340. In some implementations, the secure decrypter 320 can pass header information in decrypted form to the software decoder 334 of the application process 315. The header information can include a small percentage of the total data included in the encoded media information. In some implementations, the encrypted encoded media information can be passed to the application process 315 from the secure decrypter 320 of the secure OS 305. By extracting the header information and sending the header information to the software decoder 334, the complexity of the software decoder 334 and its interactions with the other components can be maintained within the process for the application.

In some implementations, the secure decrypter 320 can receive the encoded media information in encrypted form (e.g., AES encryption or other heavy encryption) from a content provider or source. After being decrypted by the secure decrypter 320, the decrypted media information can be stored in the secure memory 324. For example, the secure decrypter 320 can have a portion of the secure memory 324 allocated and the secure decrypter can store the decrypted encoded media information into the allocated secure memory. The secure memory 324 can provide protection to the stored media information from unauthorized access. In some implementations, a location indicator (e.g., secure handle, key, cookie, token, or the like) can indicate a location where the decrypted encoded media information is stored in the secure memory 324. The location indicator can be passed securely to the decoding hardware 350 or other trusted component and/or hardware to access the encoded media information in the secure memory 324. In some implementations, the secure decrypter can use one or more of media type information, the encoded media information, or the decryption key for decrypting the encoded media to control and/or authenticate the software decoder 334 and/or the decoding hardware 350.

In some implementations, after decrypting the encoded media information, the secure decrypter encrypts the encoded information with a different encryption. For example, the encoded media information can be received in a heavy encryption, and after decrypting the heavily encrypted media information, the secure decrypter can encrypt the media information using a lighter encryption (e.g., RC4 encryption or other light encryption). The light encryption can provide some protection to the encoded media information during transportation with little impact on processing workload. For example, light encryption can be used to prevent spoofing of the header information and/or to prevent the leaking of intentional data to entities snooping on the data traffic. In some implementations, a handshake can be conducted between a decrypter and a decoder to establish an array of session keys for a lightweight encryption (e.g., RC4 session keys or other session keys). In some implementations, after decrypting the encoded media information, the secure decrypter does not encrypt the encoded information with a different encryption.

In some implementations, the allocated memory storing decrypted encoded media information can be passed to and/or accessed by the header parser 322 included in the secure process of the secure OS 305. The header parser 322 can be any header parser described herein. The header parser 322 can determine and/or extract (e.g., copy or the like) the header information which can be sent to the application process 315. In FIG. 3, the secure decrypter 320 includes the header parser 322. In some implementations, a code fragment can be provided to merge the functionality of the secure decrypter 320 and the header parser 322. In another implementation, the header parser 322 can be a different component than the secure decrypter 320 in the secure process of the secure OS 305. For example, the secure decrypter 320 as a component can pass decrypted encoded media information to the header parser 322 as another component for parsing and/or extraction.

The header parser 322 can determine what portion of the encoded media information includes the header information. For example, at least by parsing a header, the header parser can determine an amount of data the header contains. In some implementations, the header parser 322 can constrain the amount of data read and/or passed to the software decoder based on the encoding format of the encoded media information. In some implementations, the header parser 322 can reject received data that is invalid for a particular encoding format. After the header parser 322 locates one or more headers, then the header parser can copy at least one of the one or more headers into memory until the end of the header or up to the cap amount of data set based on the encoding format of the media information. In some implementations, a header can be identified at least by having the header parser 322 parse the encoded media information to look for one or more start codes included in the header information. The start codes can indicate where the beginning and/or an end of a frame is located. For example the header parser 322 can parse a start code and determine the amount of header data to copy up to a cap amount of data and/or copy header data up to the beginning of the payload body portion that includes slice data. The non-header portion of the media information, such as a slice data body portion, can be passed for decrypting and/or decoding by the decoding hardware 350.

In some implementations, for the H.264 encoding format, a network abstraction layer unit (NALU) header and a slice header can be included in the header information and decrypted as header information. For the H.264 encoding format, after the NALU start code, the next byte indicates the header type and/or length. In another example, for the WMV encoding format, after a start code, the following byte can indicate a data type. The header parser 322 can parse through a header (e.g., a NALU header or other header) to compute a byte offset of the slice data. For the H.264 encoding format the byte offset of the slice data can be fewer than 1024 bytes of data. As the slice data offset can be determined to be within the 1024 byte cap amount of data the secure decrypter can be adapted to not decrypt and/or the header parser can be adapted to not extract more than the cap amount of data, as the cap amount of data at least includes the header information for the media information.

In some implementations, the header parser can allow the secure decrypter to decrypt up to the cap amount of data of the media information in part to determine the portion of the media information that includes the header information. The cap amount of data can be determined based on the encoding format of the media information. In some implementations, the header parser can parse the data according to the format to extract the header information from the decrypted encoded media information. For example, for a particular encoding format, the header information can be known to be included at least within an amount of data that has been encoded using the particular encoding format, and the cap amount can be set at or up to that amount of data. The header parser extracts up to the cap amount of data set for the media information when extracting the header information to be sent to the software decoder. By capping the amount of data that is decrypted and retaining some of the encoded media information in an encrypted format, the encrypted portion of the encoded media information can be protected by the encryption.

In some implementations, the header parser 322 and/or the secure decrypter 320 can determine the format of the encoded media information. For example, the header parser 322 and/or the secure decrypter 320 can evaluate the stream of media information to determine the format or the header parser 322 and/or the secure decrypter 320 can extract and/or reference the format information included in a signed policy certificate for the media information. In some implementations, the header parser 322 and/or the secure decrypter 320 can determine the encoding format of the encoded media information based on a decryption key received to decrypt the encrypted encoded media information. In some implementations, the secure decrypter 320 can use one or more of media type information, the encoded media information, or the decryption key for decrypting the encoded media information to control and/or authenticate the software decoder 334 and/or the decoding hardware 350. In some implementations, the header parser 322 can be adapted for use with a predetermined format. For example, the header parser 322 can expect that the encoded media information is encoded in a predetermined format.

In some implementations, the header parser 322 can be adapted to enforce protections for the media information by detecting that the parsed frame is corrupted or otherwise an unauthorized frame based on the expected encoding format of the media information. For example, the header parser can evaluate the size of a frame and/or the number of start codes in the frame to determine whether the frame is or is not corrupted and/or unauthorized.

In some implementations, the secure decrypter and/or the header parser does not include functionality for parsing the payload portion of the encoded media information. For example, a header parser can be adapted for parsing decrypted media information for headers and for determining and/or extracting header information up to a cap amount of data, but not include functionality for parsing slice data of the payload portion of the encoded media information. In some implementations, the secure decrypter in the secure OS does not include firmware or hardware for decoding the payload portion (e.g., slice data or the like) of the encoded media information.

With reference to FIG. 3, the secure OS 305 includes secure memory 324 which can be any secure memory described herein. In some implementations, the secure memory 324 can be reserved and/or allocated out of available memory of the computing system for use by the secure OS 305. The secure OS 305 can have ownership of the secure memory 324 and can prevent unauthorized access to the secure memory 324. For example, the secure OS 305 can prevent unauthorized access to the secure memory 324 by not sending information from the secure memory 324 to unauthorized devices, hardware, or components and/or by zeroing out data. The secure memory 324 can include a secure key store. The secure key store can store keys for memory that can store media information. The media information can be stored in an encrypted and/or encoded format in the secure memory 324. In some implementations, the information stored in the memory is encrypted. In some implementations, the secure OS 305 can pass one or more trusted components and/or hardware one or more keys (e.g., a decryption key or other key) and/or one or more indexes for a decryption key stored in secure memory that is accessible by the trusted component and/or hardware.

The secure OS 305 includes secure hardware manager 328. The secure hardware manager 328 can be any hardware manager described herein. The secure hardware manager 328 is loaded in a secure process of the secure OS 305 and can allocate secure memory, program hardware to read and/or write to secure memory, and distribute keys and/or tokens to trusted hardware.

The secure OS 305 can include one or more secure media output trust authorities such as the secure media output trust authority 326. The secure media output trust authority 326 can be any secure media output trust authority (secure media OTA) described herein. From the secure OS 305, the secure media OTA 326 can enforce output protections associated with media information. For example, the secure media OTA can authorize the outputting of media information in secure memory 324 to trusted output devices and/or locations based on output policies set for the media information. In some implementations, the secure media OTA 326 can restrict the media information from being output to untrusted and/or unauthorized output devices. In some implementations, the secure media OTA can allow decoded media information to be placed into memory owned by a trusted component. For example, the secure media OTA can be adapted to allow for secure transcoding of decoded media information that is to be stored and/or transmitted over a network (e.g., wired and/or wireless network). The secure media OTA 326 in the secure OS can proxy and/or monitor the actions of one or more media output trust authorities included in the application process 315 such as the media OTA 338. In some implementations, the secure media OTA 326 can examine the characteristics of an output device to verify that the application and/or application process is not attempting to redirect the content to an unauthorized output device.

The application process 315 can be a process that is part of a media pipeline for the application 310 of the computing system 300. The computing system 300 can include one or more applications such as the application 310. The application 310 can include one or more processes such as the application process 315. The application process 315 includes one or more components for media processing. The components can implement part of the media pipeline which at least decodes and/or outputs media information. The components of the process 315 include an input trust authority 330, a media decrypter 332, the software decoder 334, a media processor 336, and a media output trust authority 338. The application process 315 can include a renderer 342 which includes the media output trust authority 338.

The application 310 includes one or more media source components such as the media source 344. The media source 344 can demultiplex a media stream into various types of media information such as video data and/or audio data. In some implementations, a secure demultiplexing component can be used to securely split the received content into multiple streams. The media source 344 can receive a media stream from the byte stream component 346, which can perform network and/or read data from one or more computer-readable media or a communications network. The media source 344 can also determine the encoding format(s) for the media information and provide a media type which at least indicates the encoding format of the media information to one or more components of the application process and/or a process of the secure OS. For example, the media source 344 can inform the media pipeline of the encoding format of the encoded media information received from the content provider. The encoding format of the media information can be used to load appropriate components such as a media decrypter, a header parser, and a software decoder based on the encoding format. In some implementations, once components are loaded in the application process and/or the secure OS based on a reported media type of the media information, format information included in a signed policy certificate for the media information can be used to verify that the appropriate format was reported to load the components.

The application process 315 includes one or more input trust authorities such as the input trust authority 330, which can be any input trust authority (ITA) described herein. In some implementations, the ITA 330 can communicate with a content provider to receive information that can be used for decoding media information. In some implementations, the ITA 330 provides the media decrypter 332 to be loaded into the media pipeline for the application process 315. In some implementations, an ITA can provide a media decrypter component for one or more media streams. For example, when media data is demultiplexed into more than one media stream, the ITA can load one or more appropriate components, such as media decypters or the like, in the respective media streams. In some implementations, content information for respective media streams can be included in a signed policy certificate received for encoded media information of the media streams. For example, one or more decryption keys can be included in a signed policy certificate for respective media streams. From the information included in the signed policy certificate, a secure decrypter can select the appropriate decryption key which can be used to decrypt encrypted encoded media information received at the secure decrypter. The ITA 330 can receive information such as one or more of encrypted media information, a decryption key associated with the encrypted media information, a digitally signed policy certificate, or other information that can be used in media processing and/or component selection. For example, information can be received that is used in selecting one or more software decoder components or other components included in a media pipeline. The ITA 330 can receive a signed policy certificate which can include a description of one or more policies that indicate protections and/or authorized uses of the media information and other encrypted information associated with the signed policy certificate. In some implementations, the signed policy certificate can be signed using an encryption-based digital signature. The digital signature can be evaluated to determine that the policy information has not been compromised and that the policies have been protected during transmission.

In some implementations, the ITA 330 can verify that the components loaded in the application process 315 are allowed and/or authorized to be part of the media pipeline based on the policies. The ITA 330 can manage and/or verify enforcement of the protections set by the policies for the media information. In some implementations, the policies for the media information can include instructions regarding DRM protections that can be enforced for the media information during decoding and/or outputting of the media information. In some implementations, the policies for the media information can include information about one or more functionalities, properties, protocols, or types of output devices authorized to output the media information and/or components authorized to process the media information. In some implementations, the ITA 330 can convey to one or more output trust authorities such as the media output trust authority 338 the output policies and/or protections that are to be applied and enforced by the respective output trust authority for the media information. In some implementations, the ITA 330 can verify enforcement of the output policies specified in the signed policy certificate for the media information at least by examining one or more of the output trust authorities in the media pipeline of the application process. For example, after the media OTA 338 allows decoded media information to be output to an output device, the media OTA 338 can report back to the ITA 330 indicating that the output enforcement policies are followed.

The media OTA 338 can be any media output trust authority (media OTA) described herein. The application process 315 includes one or more media output trust authorities such as the media output trust authority 338. The media OTA 338 as a component of the media pipeline can manage the outputting of media information to one or more output devices based on policies for the media information. For example, the media OTA 338 can enforce output protections associated with the media information that are set by a content source or provider in one or more policies.

The computing system 300 can include decoding hardware 350. The decoding hardware 350 can include one or more of decryption and/or decoding hardware such as bus decryption hardware (e.g., DXVA bus decryption hardware, or the like), Advanced Encryption Standard (AES) hardware, a graphics processing unit (GPU), or the like. In some implementations, a bus can be modified to allow for an AES counter mode to be skipped ahead to resume decryption of slice data and/or other picture data included in the encrypted encoded media information after one or more headers have been decrypted in a secure OS. In some implementations, a beginning offset into a buffer can be passed to the decoding hardware. In another implementation, a beginning offset into a buffer is not passed to the decoding hardware. In some implementations, an AES counter is not modified to allow for an AES counter mode to be skipped ahead to resume decryption of slice data included in the encrypted encoded media information.

The computing system 300 can include one or more compositing components such as compositing component 352. The compositing component 352 can be directed by the media OTA 338 to output decoded media information to one or more locations or output devices. The computing system can include one or more output devices such as output device 356. The output device 356 can output decoded media information for display.

Figure 4:
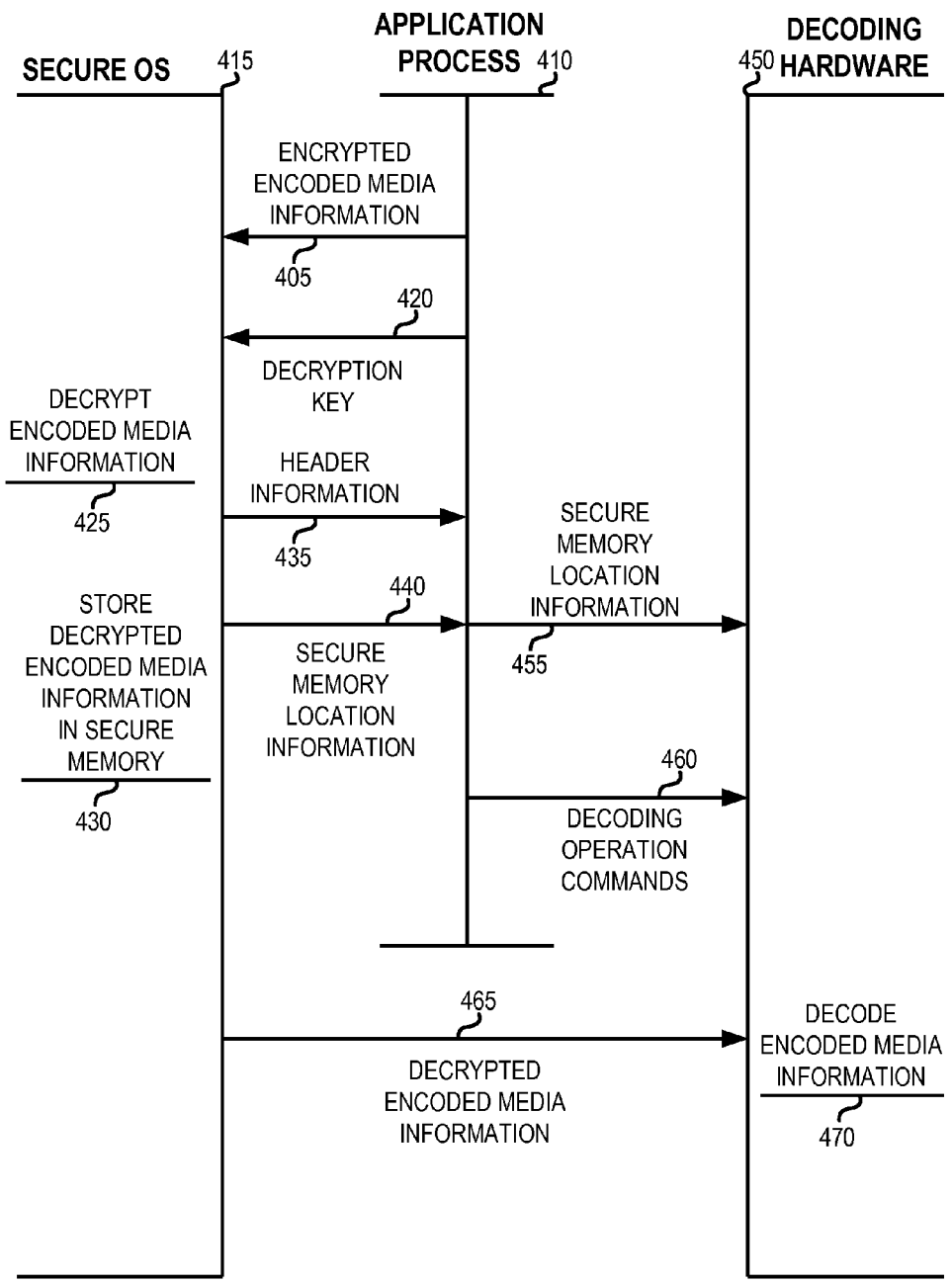
FIG. 4 is a diagram illustrating the decoding of media information in part through sending encoded media information stored using a secure operating system.

Exemplary Decoding Protected Media Information in Part Through Sending Encoded Media Information Stored Using a Secure Operating System FIG. 4 is a diagram illustrating the decoding of media information in part through sending encoded media information stored using a secure operating system. In FIG. 4, at 405, an application process 410 sends encrypted encoded media information to be received at a secure OS 415. At 420, the application process 410 sends a decryption key 420 that is received at the secure OS 415. At 425, the decryption key is used to decrypt the encrypted encoded media information. In some implementations, at least a portion of the header information included in the encoded media information is unencrypted when received by the secure OS 415, and the encrypted portion of the encoded media information is decrypted using the decryption key. At 430, the encoded media information that has been decrypted is stored in secure memory of the secure OS 415. At 435, the secure OS 415 extracts decrypted header information from the encoded media information and sends the header information to be received at a software decoder of the application process 410. At 440, the secure OS 415 sends the location of where the decrypted encoded media information is stored in the secure memory to the software decoder of the application process 410, to be forwarded to the decoding hardware 450. At 455, the application process 410 forwards the location of the encoded media information in the secure memory to the decoding hardware 450. Also, at 460, the software decoder of the application process 410 uses control information in the received header information to generate one or more decoding operation commands and sends the decoding operation commands to the decoding hardware 450. At 465, the encoded media information stored in the secure memory is accessed by the trusted decoding hardware 450 using the location information, and the secure OS 415 sends the decrypted encoded media information to be received by the decoding hardware 450. At 470, the decoding hardware 450 decodes the encoded media information to produce decoded media information at least using one or more of the received decoding operation commands.

Figure 5:
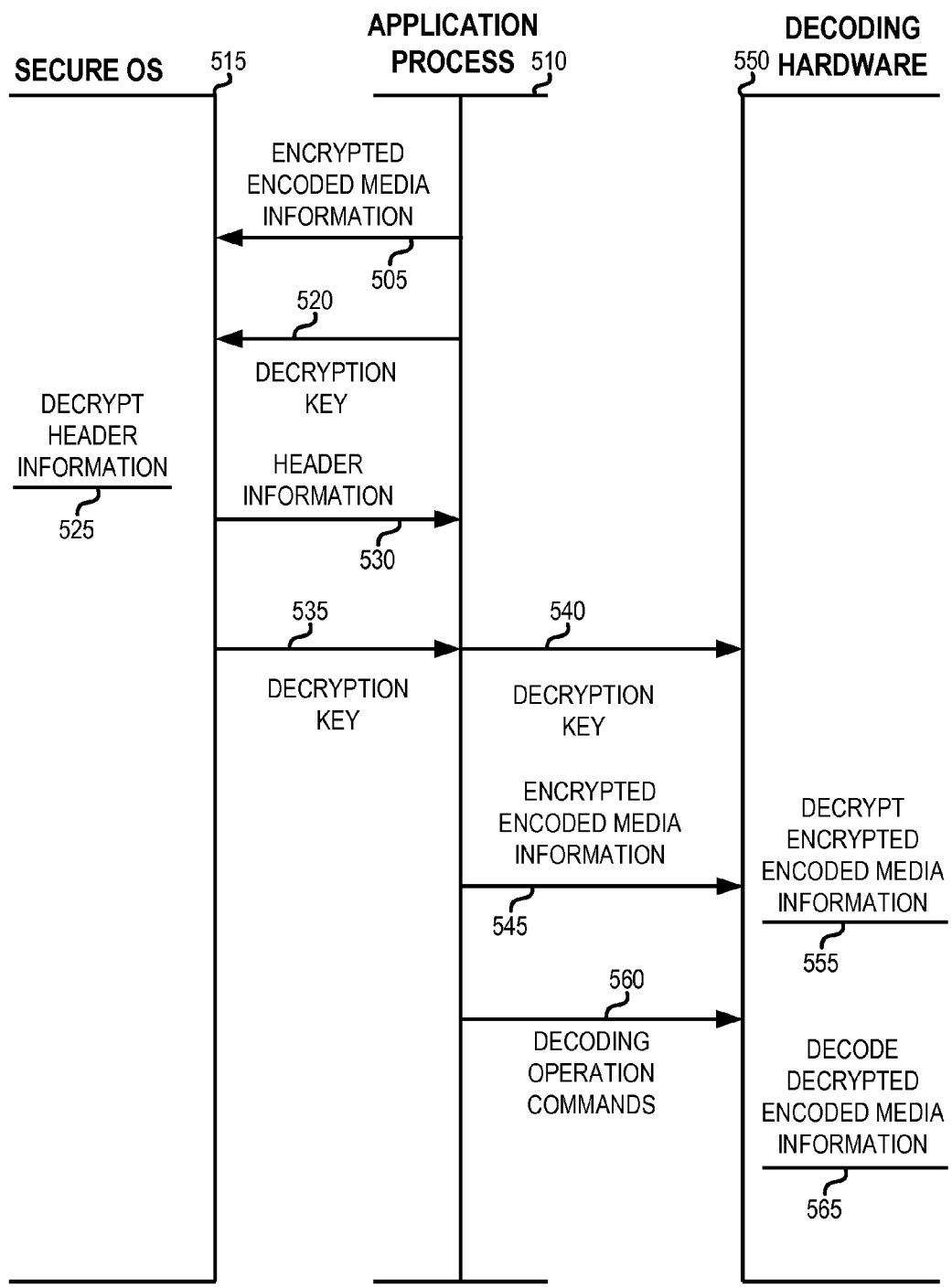
FIG. 5 is a diagram illustrating the decoding of encrypted encoded media information in part through securely sending a decryption key to decoding hardware using a secure operating system.

Exemplary Decoding of Protected Media Information in Part Through Securely Sending a Decryption Key to Decoding Hardware Using a Secure Operating System FIG. 5 is a diagram illustrating the decoding of encrypted encoded media information in part through securely sending a decryption key to decoding hardware using a secure operating system. In FIG. 5, at 505, an application process 510 sends a copy of the encrypted encoded media information, which is stored at the application process 510, to a secure OS 515. At 520, the application process 510 sends a decryption key that is received at the secure OS 515. At 525, the decryption key is used to decrypt at least the header information included in the encrypted encoded media information. At 530, the secure OS 515 extracts decrypted header information included in the encoded media information and sends it to a software decoder of the application process 510. At 535, the secure OS 515 sends the decryption key, through a secure channel, to the software decoder of the application process 510, to be forwarded to the decoding hardware 550. At 540, the software decoder of the application process 510 forwards the decryption key to the decoding hardware 550. At 545, the application process 510 sends a copy of the encrypted encoded media information to the decoding hardware 550. In some implementations, a copy of the encrypted encoded media information can be sent from the secure OS 515 to the decoding hardware 550 through the application process 510. In FIG. 5, at 555, the decoding hardware 550 uses the received decryption key to decrypt the received encoded media information that is encrypted to access the encoded media information in a decrypted form. At 560, the application process 510 uses the received decrypted header information to generate decoding operation commands and sends the decoding operation commands to the decoding hardware 550. At 565, the decoding hardware decodes the decrypted encoded media information in part using the received decoding operation commands to produce decoded media information.

Figure 6:
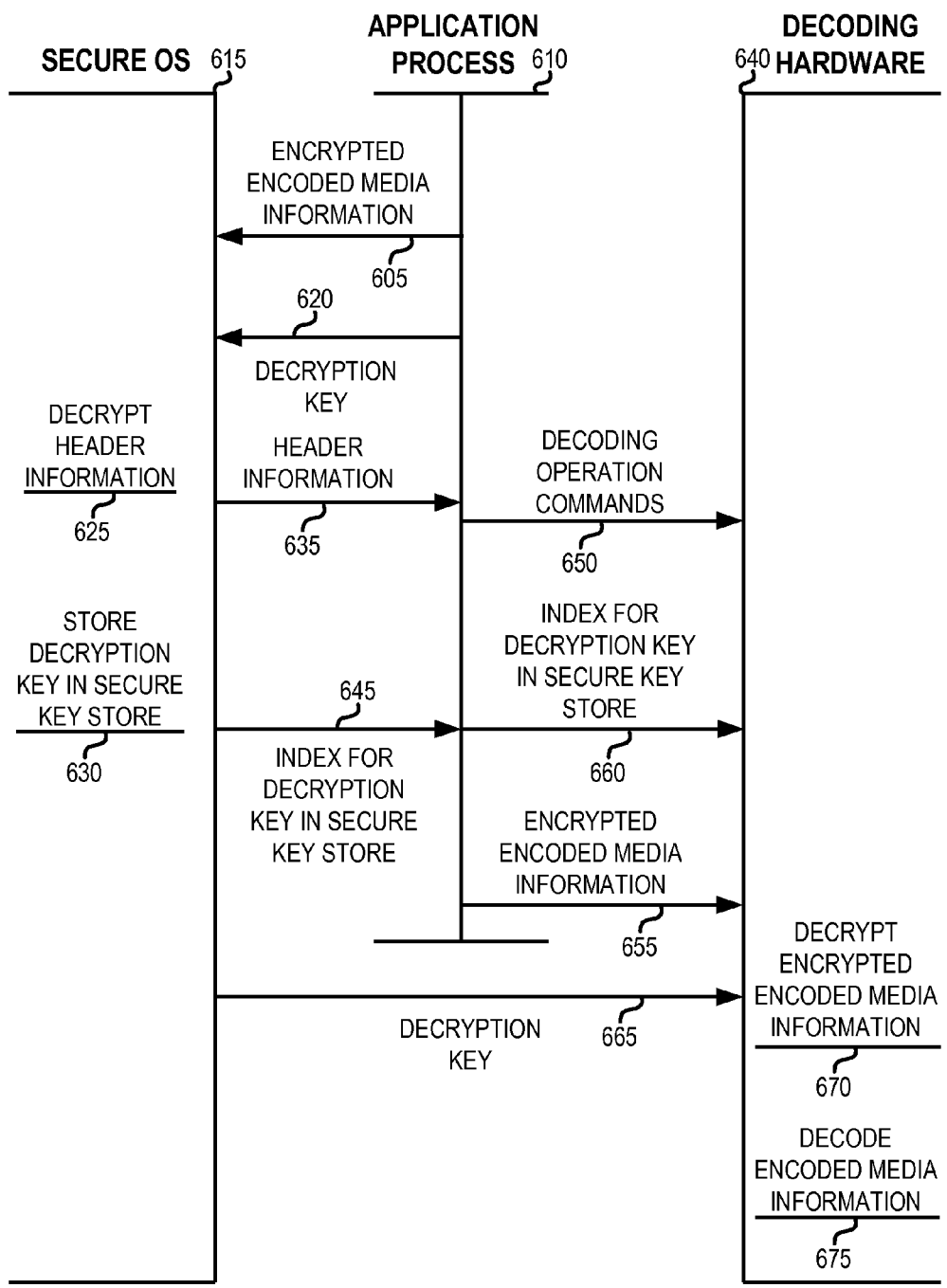
FIG. 6 is a diagram illustrating the decoding of protected media information in part through securely sending a securely stored decryption key to decoding hardware using a secure operating system.

Exemplary Decoding of Protected Media Information in Part Through Securely Sending a Stored Decryption Key to Decoding Hardware Using a Secure Operating System FIG. 6 is a diagram illustrating the decoding of encrypted encoded media information in part through securely sending, to decoding hardware, a decryption key securely stored using a secure operating system. In FIG. 6, at 605, an application process 610 sends encrypted encoded media information to a secure OS 615. At 620, the application process 610 sends a decryption key that is received at the secure OS 615. At 625, the decryption key is used to decrypt at least the header information included in the encrypted encoded media information. In some implementations, at least a portion of the header information included in the encoded media information is unencrypted when received by the secure OS 615 and is not decrypted at the secure OS. At 630, the decryption key is stored in secure memory of the secure OS 615. At 635, the secure OS 615 extracts decrypted header information from the encoded media information and sends it to a software decoder of the application process 610. At 645, the secure OS 615 sends the index of the decryption key for decrypting the encrypted encoded media information to the application process 610, to be forwarded to the decoding hardware 640. The index for the decryption key can be used to reference the decryption key in the secure key store of the secure OS 615. At 660, the application process 610 sends the index of the decryption key to the decoding hardware 640. Also, at 650, the software decoder of the application process 610 uses control information in the received header information to generate one or more decoding operation commands and sends the decoding operation commands to the decoding hardware 640. At 655, the application process 610 sends a copy of the encrypted encoded media information to the decoding hardware 640. In some implementations, a copy of the encrypted encoded media information can be sent from the secure OS 615 to the decoding hardware 640 through the application process 610. At 665, the decryption key stored in the secure key store of the secure OS is accessed by the trusted decoding hardware 640 using the index for the decryption key (i.e., the key index) and the secure OS 615 sends the decryption key to the decoding hardware 640. At 670, the decoding hardware 640 decrypts the encrypted encoded media information using the received decryption key to access the encoded media information. At 675, the decoding hardware 640 decodes the encoded media information to produce decoded media information at least using one or more of the received decoding operation commands.

Figure 7:
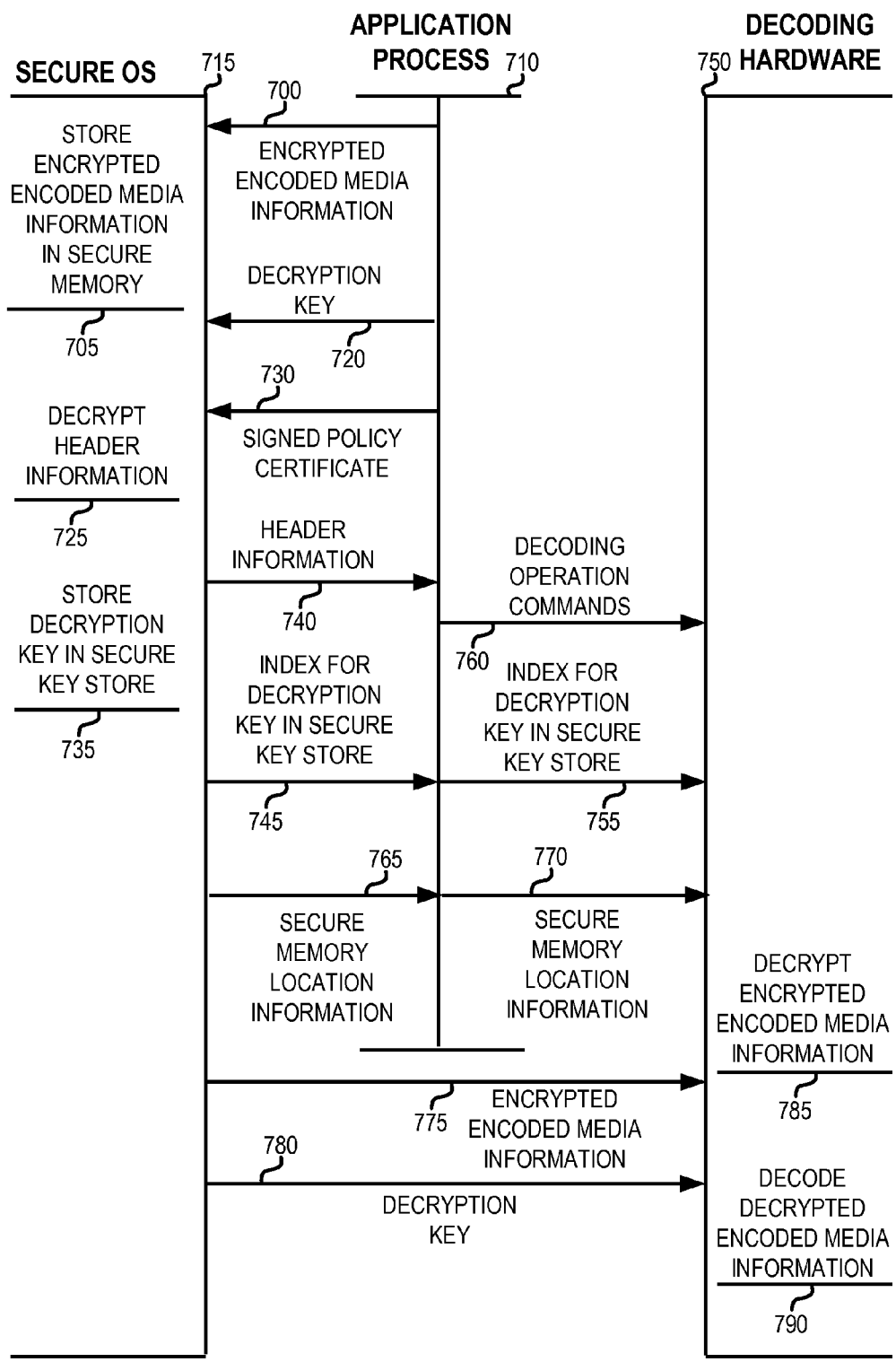
FIG. 7 is a diagram illustrating the decoding of encrypted encoded media information in part through securely sending, to decoding hardware, a securely stored decryption key and the securely stored encrypted encoded media information using a secure operating system.

Exemplary Decoding in Part Through Securely Sending a Securely Stored Decryption Key and Securely Stored Media Information Using a Secure Operating System FIG. 7 is a diagram illustrating the decoding of encrypted encoded media information in part through securely sending, to decoding hardware, a securely stored decryption key and the securely stored encrypted encoded media information using a secure operating system. In FIG. 7, at 700, an application process 710 sends encrypted encoded media information to a secure OS 715. At 705, the encrypted encoded media information is stored in secure memory of the secure OS 715. At 720, the application process 710 sends a decryption key that is received at the secure OS 715. At 725, the decryption key is used to decrypt at least the header information included in the encrypted encoded media information. In some implementations, at least a portion of the header information included in the encoded media information is unencrypted when received by the secure OS 615 and is not decrypted at the secure OS. At 735, the decryption key is stored in secure memory of the secure OS 715. At 730, the application process 710 sends a signed policy certificate that is received at the secure OS 715. In some implementations, the signed policy certificate can include the decryption key and/or information regarding a codec associated with the media information. At 740, the secure OS 715 extracts at least the decrypted header information from the encoded media information and sends it to a software decoder of the application process 710.

At 745, the secure OS 715 sends the index of the decryption key for decrypting the encrypted encoded media information to the application process 710, to be forwarded to the decoding hardware 750. The index for the decryption key can be used to reference the decryption key in the secure key store of the secure OS 715. At 755, the application process 710 sends the index of the decryption key to the decoding hardware 750. Also, at 760, the software decoder of the application process 710 uses control information in the received header information to generate one or more decoding operation commands and sends the decoding operation commands to the decoding hardware 750.

At 765, the secure OS 715 sends the location of where the decrypted encoded media information is stored in the secure memory to the software decoder of the application process 710, to be forwarded to the decoding hardware 750. At 770, the application process 710 sends the location of the encoded media information in the secure memory to the decoding hardware 750. At 775, the encrypted encoded media information stored in the secure memory is accessed by the trusted decoding hardware 750 using the location information, and the secure OS 715 sends the encrypted encoded media information to the decoding hardware 750. At 780, the decryption key stored in the secure key store of the secure OS is accessed by the trusted decoding hardware 750 using the index for the decryption key (i.e., the key index), and the secure OS 715 sends the decryption key to the decoding hardware 750. At 785, the decoding hardware 750 decrypts the encrypted encoded media information using the received decryption key to access the encoded media information. At 790, the decoding hardware 750 decodes the encoded media information to produce decoded media information at least using one or more of the received decoding operation commands.

Figure 8:
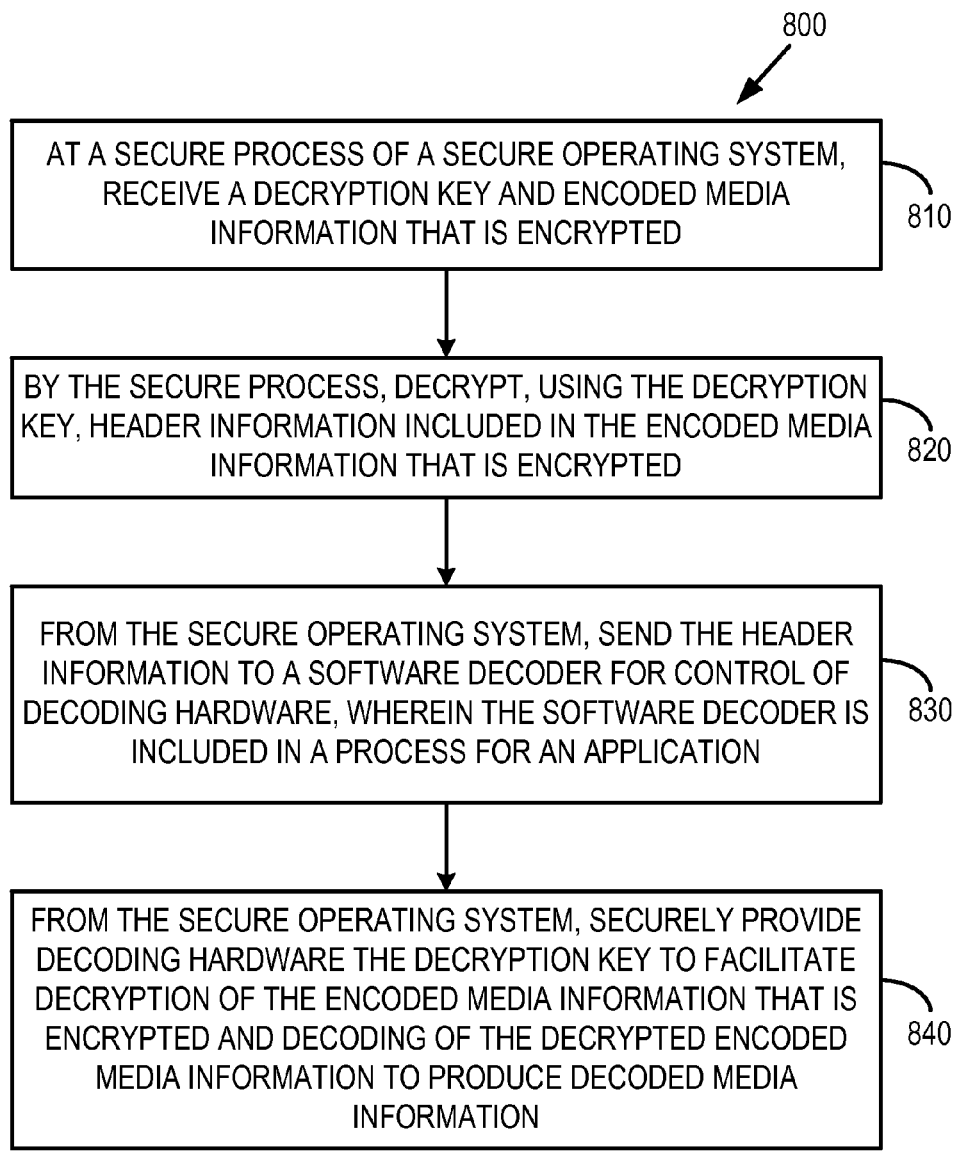
FIG. 8 is a flow diagram illustrating an exemplary method for sending header information to a software decoder and securely providing decoding hardware a decryption key from a secure operating system to facilitate decryption and decoding of encrypted encoded media information.

Exemplary Method for Facilitating Decoding of Protected Encoded Media Information at Least by Sending Header Information to a Software Decoder and Securely Providing Decoding Hardware a Decryption Key Using a Secure Operating System FIG. 8 is a flow diagram illustrating an exemplary method 800 for sending header information to a software decoder and securely providing decoding hardware a decryption key from a secure operating system to facilitate decryption and decoding of encoded media information. In FIG. 8, a decryption key and encoded media information that is encrypted are received at a secure process of a secure operating system at 810. For example, an ITA of an application process can send encrypted encoded media information and a decryption key to a secure decrypter loaded in a secure process of the secure OS. In some implementations, at least a portion of the header information included in the encoded media information is unencrypted when received at the secure decrypter from the ITA.

At 820, by the secure process, header information, included in the encoded media information, is decrypted using the decryption key. For example, a secure decrypter loaded in the secure process of a secure OS decrypts header information up to a cap amount of data of the encrypted encoded media information. In some implementations, the header information can include a small amount of the overall data included in the encoded media information. In some implementations, when at least a portion of the header information included in the encoded media information is unencrypted when received by the secure process, at least the unencrypted portion of the header information can be extracted by a header parser for sending to the software decoder. In some implementations, the secure decrypter can receive a decryption key that can be used to decrypt the encoded media information that is encrypted. In some implementations, from information included in a signed policy certificate, the secure decrypter can select a decryption key that can be used to decrypt the encoded media information that is encrypted.

At 830, the header information is sent from the secure operating system to a software decoder for control of decoding hardware. In some implementations, the software decoder is included in a process for an application. For example, a header parser included in the secure OS can extract up to a cap amount of data that includes the header information. The header parser can send, from the secure OS, the extracted information up to the cap amount of data to a software decoder included in an application process.

At 840, the decryption key is securely provided from the secure operating system to decoding hardware to facilitate decryption of the encoded media information that is encrypted and to facilitate decoding of the decrypted encoded media information to produce decoded media information. For example, the decryption key can be provided to the decoding hardware using a secure channel or the decoding hardware can receive the decryption key from a secure key store using a securely passed decryption key index. The decoding hardware can use the decryption key to decrypt the encrypted encoded media information so that the decoding hardware can have access to the encoded media information in a decrypted form for decoding. In some implementations, the secure OS decrypts the encrypted encoded media information using the received decryption key and re-encrypts the encoded media information so that the re-encrypted encoded media information can be decrypted using a different decryption key. The decryption key for decrypting the re-encrypted encoded media information can be securely passed to the decoding hardware at least to provide the decoding hardware access to the encoded media information that has been re-encrypted.

Figure 9:
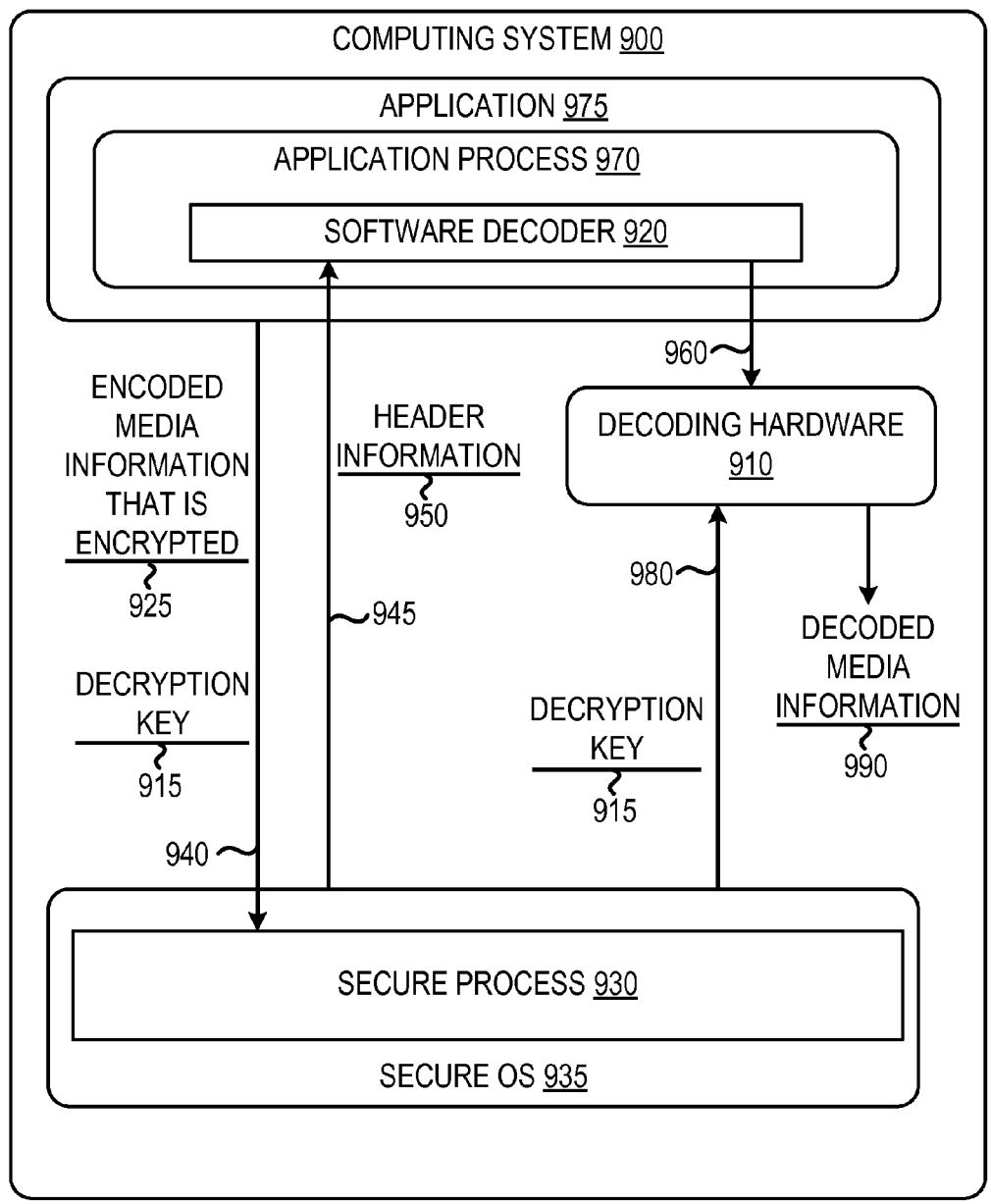
FIG. 9 is a schematic diagram illustrating an exemplary computing system for sending header information to a software decoder and securely providing decoding hardware a decryption key from a secure operating system to facilitate decryption and decoding of encrypted encoded media information.

Exemplary System for Facilitating Decoding of Protected Encoded Media Information at Least by Sending Header Information to a Software Decoder and Securely Providing Decoding Hardware a Decryption Key Using a Secure Operating System FIG. 9 is a schematic diagram illustrating an exemplary computing system 900 for sending header information to a software decoder 920 and securely providing decoding hardware 910 a decryption key 915 from a secure operating system 935 to facilitate decryption and decoding of encoded media information that is encrypted 925. In FIG. 9, a decryption key 915 and encoded media information that is encrypted 925 are received at a secure process 930 of a secure operating system 935 at 940. The secure process 930 decrypts at least header information, which is included in the encoded media information that is encrypted 925, up to a cap amount of data using the decryption key 915. In some implementations, at least a portion of the header information included in the encoded media information can be unencrypted when received by the secure process, and at least the unencrypted portion of the header information can be extracted by a header parser for sending to the software decoder 920. At 945, the header information 950 is sent from the secure operating system 935 to a software decoder 920 for at least controlling of decoding hardware 910. The software decoder 920 can use control information included in the header information 950 at least for controlling the decoding hardware 910. At 960, the software decoder controls the decoding hardware at least by sending one or more decoding operation commands to the decoding hardware. The software decoder 920 is included in an application process 970 for the application 975. At 980, the decryption key 915 is securely provided from the secure operating system 935 to decoding hardware 910 to facilitate decryption of the encoded media information that is encrypted 925 and to facilitate decoding of the decrypted encoded media information to produce decoded media information 990.

Figure 10:
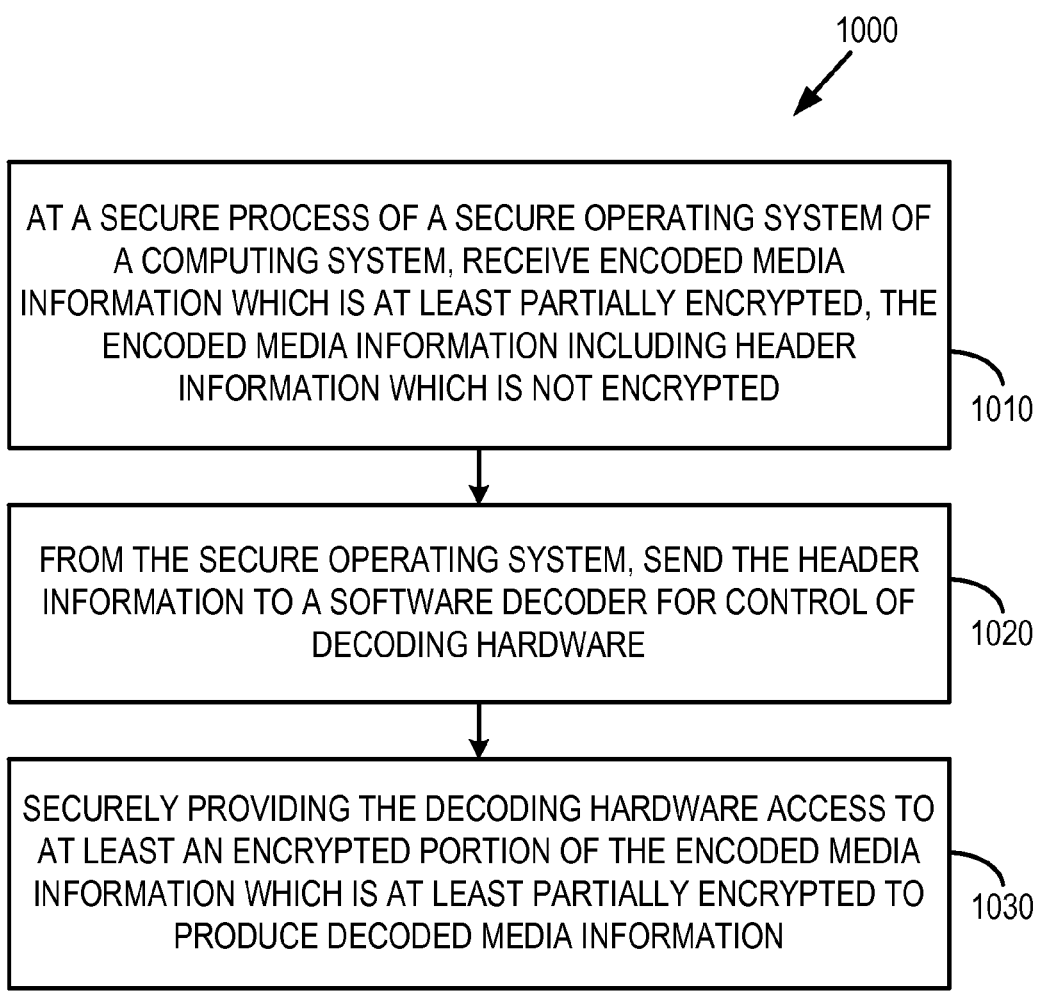
FIG. 10 is a flow diagram illustrating an exemplary method for decoding encoded media information, which is at least partially encrypted, at least by sending header information to a software decoder and securely providing decoding hardware access to encoded media information using a secure operating system.

Exemplary Method for Decoding Encoded Media Information, which is at Least Partially Encrypted, at Least by Sending Header Information to a Software Decoder and Securely Providing Decoding Hardware Access to Encoded Media Information Using a Secure Operating System FIG. 10 is a flow diagram of an exemplary method 1000 for decoding encoded media information, which is at least partially encrypted, at least by sending header information to a software decoder and securely providing decoding hardware access to encoded media information using a secure OS. In FIG. 10, encoded media information which is at least partially encrypted is received at a secure process of a secure operating system of the computing system at 1010. The encoded media information can include header information which is not encrypted. For example, encoded media information can be received that includes header information such as one or more headers that are unencrypted and a portion of the received encoded media information that includes slice data can be encrypted. In some implementations, the secure process can receive other information such as one or more of a signed policy certificate, a decryption key, a media type, or the like.

At 1020, the header information is sent to a software decoder for control of decoding hardware. For example, a header parser of the secure process of the secure OS can extract the unencrypted header information and send the header information to a software decoder. In some implementations, the header information is sent to the software decoder from the secure process along with a media type. In some implementations, information can be sent securely to the software decoder to be securely passed (e.g., via a secure channel) to one or more decoding hardware. The securely passed information can include one or more of a key index referencing a decryption key, an encrypted portion of the encoded media information, decryption key, or a location where decrypted encoded media information is stored in secure memory of the secure OS. In some implementations, information sent to the software decoder from the secure process such as the header information and/or a media type can be encrypted at the secure process before being sent to the software decoder.

The encrypted portion of the encoded media information can be protected by the secure OS by maintaining the encrypted portion in its encrypted form. In some implementations, the secure OS decrypts the encrypted portion of the encoded media information using a first decryption key and re-encrypts at least the decrypted portion of the encoded media information so that the portion can be decrypted using a second decryption key. In some implementations, the encrypted portion of the encoded media information can be protected by the secure OS by decrypting the encrypted portion and storing at least the portion of the encoded media information that was decrypted in secure memory. In some implementations, the received encoded media information can be stored in a secure memory of the secure OS at least partially encrypted or at least partially unencrypted.

At 1030, the decoding hardware is securely provided access to at least an encrypted portion of the encoded media information which is at least partially encrypted to produce decoded media information. For example, the decoding hardware can access an encrypted portion of the encoded media information at least by decrypting the encrypted portion of the encoded media information. In some implementations, the decoding hardware can be securely passed a decryption key to decrypt the encrypted portion. In some implementations, the decryption key can be passed from a secure key store of the secure OS or the decryption key can be passed to the decoding hardware through a secure channel from the secure OS. In some implementations, the portion of the encoded media information that is encrypted can be decrypted at the secured process and stored in as secure memory that can be accessed by the decoding hardware to give the decoding hardware access to the portion of the encoded media information that is encrypted when received by the secure process. In some implementations, at least the encrypted portion of the encoded media information can be stored in a secure memory of the secure OS that is accessible by the trusted decoding hardware. In some implementations, the decoding hardware can be securely provided a location where the encoded media information is located in the secure memory in at least a partially encrypted form or at least a partially unencrypted form.

Figure 11:
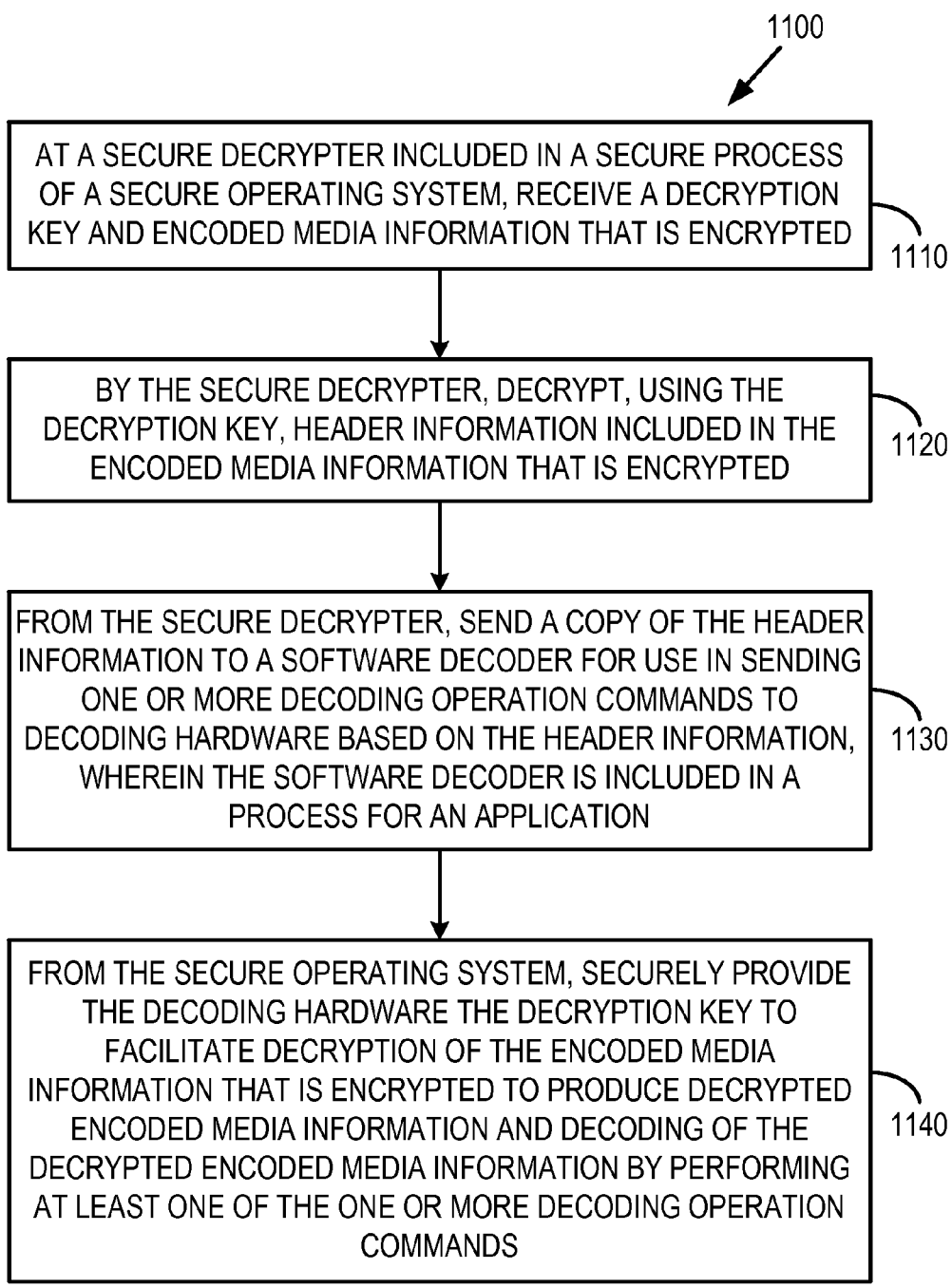
FIG. 11 is a flow diagram of an exemplary method for sending a copy of header information and securely providing decoding hardware a decryption key to facilitate decoding of encoded media information that is encrypted.

Exemplary Method for Facilitating Decoding of Encoded Media Information at Least by Securely Providing Decoding Hardware a Decryption Key and Sending a Copy of Header Information from a Secure Decrypter for Use in Sending Decoding Operation Commands FIG. 11 is a flow diagram of an exemplary method 1100 for sending a copy of header information and securely providing decoding hardware a decryption key to facilitate decryption and decoding of encoded media information that is encrypted. In FIG. 11, at 1110, a decryption key and encoded media information that is encrypted are received at a secure decrypter included in a secure process of a secure operating system.

At 1120, at least header information that is included in the encoded media information that is encrypted is decrypted by the secure decrypter using the decryption key. The header information can include a small percentage of the overall data included in the encoded media information. In some implementations, at least a portion of the header information included in the encoded media information is unencrypted when received by the secure process and at least a copy of the unencrypted portion of the header information can be extracted by a header parser for sending from the secure OS to a software decoder.

At 1130, at least a copy of the header information is sent from the secure decrypter to a software decoder for use in sending one or more decoding operation commands to decoding hardware based on the header information. The software decoder is included in a process, of an application, that is used to implement a media pipeline.

The software decoder can parse control information included in the header information. Enough header data can be exposed for the software decoder to facilitate media pipeline interfacing and timing functions. In some implementations, the control information can be used to determine the width of the media, the height of the media, the organization of frames of the media, how much memory should be allocated for processing the media information, or the like.

In some implementations, control information can include information about the media such as picture organization, resolution, encoding structure (e.g., progressive, interlaced, or the like), a number of slices, a compression method (e.g., an encoding format), or size of the media. In some implementations, the software can use the control information to allocate memory, manage memory, order frames, or the like.

The control information can be used to generate one or more decoding operation commands. The decoding operation commands can include instructions for controlling the decoding engine/hardware. In some implementations, the decoding operation commands are pushed into a work queue for the decoding hardware to control the decoding hardware. In some implementations, the software decoder can communicate with other components to control decoding.

At 1140, the decoding hardware is securely provided the decryption key from the secure operating system to facilitate decryption of the encoded media information that is encrypted to produce decrypted encoded media information and to facilitate decoding of the decrypted encoded media information by performing at least one of the one or more decoding operation commands.

Figure 12:
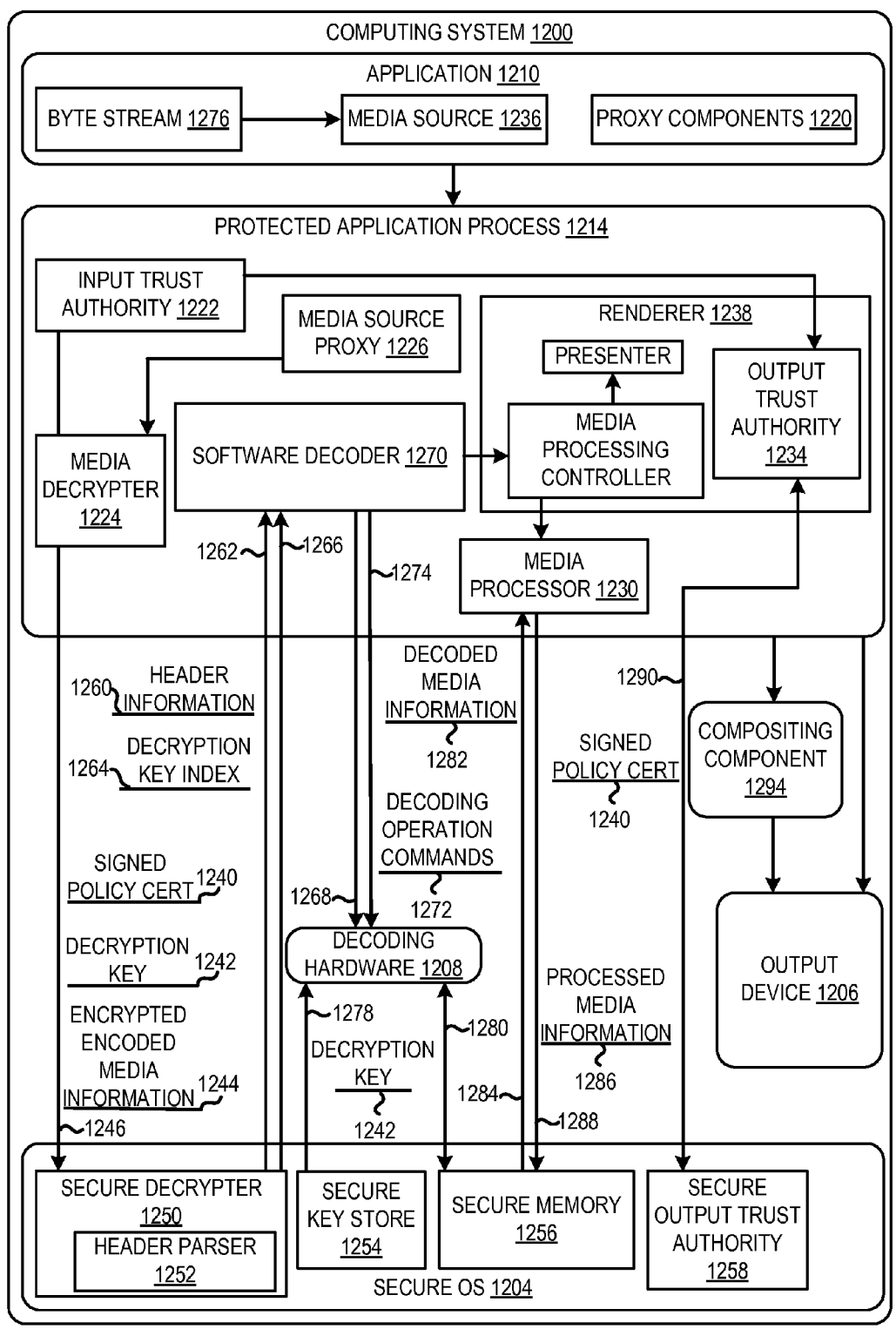
FIG. 12 is a schematic diagram illustrating an exemplary computing system for decoding and enforcing output protections of protected media information using a secure operating system.

Exemplary System for Facilitating Decoding of Encoded Media Information at Least by Securely Providing Decoding Hardware a Decryption Key and Sending a Copy of Header Information from a Secure Decrypter for Use in Sending Decoding Operation Commands FIG. 12 is a schematic diagram illustrating an exemplary computing system 1200 for decoding and/or outputting protected media using a secure operating system 1204. The computing system 1200 includes one or more secure operating systems such as the secure OS 1204. The computing system includes one or more output devices such as output device 1206. The computing system 1200 includes decoding hardware 1208 and one or more applications such as application 1210.

The application 1210 uses one or more application processes to implement a media pipeline. The application 1210 uses the protected application process 1214 and an untrusted process. The untrusted process of the application 1210 can include and/or implement a byte stream component 1276 which can read data from one or more computer-readable media and/or perform network operations. The untrusted process of the application 1210 can include a media source component 1236. The media source component 1236 can demultiplex received media data into different streams. The media source component 1236 can have a media source proxy component 1226 in the protected application process 1214. The untrusted process of the application 1210 can include one or more proxy components 1220 that proxy one or more components in the protected application process 1214 that is a trusted process.

The protected application process 1214 implements a portion of a media pipeline that can process media information. For example, the media pipeline contains control components such as one or more input trust authorities and one or more output trust authorities. The media pipeline can include one or more processing components such as the media decrypter 1224, the software decoder 1270, a renderer 1238, the media processor 1230 or other processing components. For example, by the renderer, media information can be sent to a compositing component 1294 for composition before outputting the media information to one or more output devices and/or locations.

In creating the media pipeline, the application 1210 can load one or more verified components in the process based in part on the designated encoding format of the media information. Based on one or more of the signed components loaded in the protected application process 1214, the secure OS 1204 can load appropriate secure components in the secure process of the secure OS 1204. For example, when a component is loaded in the protected application process 1214, a secure component can be loaded in the secure OS 1204 that can be a secure proxy to the verified component loaded in the protected application process 1214. The proxy components 1220 loaded by the application 1210 in an untrusted process are proxy components, for the application 1210, to the verified components in the protected application process 1214.

The verified components included in the protected application process 1214 can be digitally signed or otherwise protected so that the components can be used to create the media pipeline for the application 1210. A verified component can be verified and/or validated as being an authorized and/or protected component to be loaded into the protected application process 1214. For example, the components can be signed as trusted components, and the signatures of the components can be used to verify the components as trusted components before the components are loaded into the protected application process 1214. In some implementations, one or more software obfuscation techniques can be used to increase the security of the verified components in the environment of the protected application process 1214.

The protected application process 1214 can include one or more input trust authorities such as the input trust authority 1222. The input trust authority (ITA) 1222 receives content from a content source. The received content can include information such as one or more signed policy certificates, decryption keys, and media information. In FIG. 12, at 1246, the input trust authority 1222 sends, through a secure channel, a signed policy certificate 1240, a decryption key 1242, and media information 1244 to a secure decrypter 1250 of the secure OS 1204. The content can be sent to the secure decrypter 1250 through a media decrypter 1224 loaded in the protected application process 1214. The media decrypter 1224 can be a proxy component, in the protected application process 1214, to the secure decrypter 1250 in the secure OS 1204. The secure decrypter 1250 can be any secure decrypter described herein. The secure decrypter 1250 includes a header parser 1252. The header parser 1252 can be any header parser described herein.

In FIG. 12, using the decryption key 1242, the secure decrypter 1250 decrypts a portion of the encrypted encoded media information 1244 that includes the header information 1260. The header parser 1252 extracts a copy of the header information 1260 from the decrypted encoded media information up to a cap amount of data. In some implementations, at least a portion of the header information included in the encoded media information can be unencrypted when received by the secure process and at least the unencrypted portion of the header information can be extracted by the header parser 1252 for sending to the software decoder 1270. The secure decrypter 1250 stores the encrypted encoded media information 1244 in the secure memory 1256 of the secure OS 1204. Also, the secure decrypter 1250 stores the decryption key in a secure key store 1254 of the secure OS 1204.

The header parser sends the header information 1260 to the software decoder 1270 at 1262. At 1266, the secure decrypter sends an index 1264 of the decryption key 1242 stored in the secure key store 1254 that can be used to reference and/or access the decryption key 1242 in the secure key store 1254. At 1266, the secure decrypter 1250 sends the index 1264 of the decryption key 1242 to the software decoder 1270 securely through a secure channel. The software decoder 1270 can be any software decoder described herein. At 1268, the software decoder 1270 securely sends the received index 1264 of the decryption key to the decoding hardware 1208 through a secure channel. The software decoder 1270 parses the received header information 1260 for control information and uses the control information to generate one or more decoding operation commands 1272. The one or more decoding operation commands 1272 are sent to the decoding hardware 1208 at 1274 to control the decoding hardware 1208 for decoding at least a portion of the encrypted encoded media information 1244.

At 1278, the decoding hardware 1208 uses the index 1264 of the decryption key 1242 to retrieve the decryption key 1242 from the secure key store 1254 of the secure OS 1204. As shown at 1280, the decoding hardware 1208, as trusted hardware, can communicate with the secure OS 1204 to send and/or receive information. The decoding hardware communicates with the secure OS 1204 to retrieve the encrypted encoded media information 1244 which is stored in the secure memory 1256. The decoding hardware 1208 uses the decryption key 1242 to decrypt the encrypted encoded media information 1244 and then decodes the media information to produce decoded media information 1282. The decoded media information 1282 is sent from the decoding hardware 1208 to the secure memory 1256 to be stored. In some implementations, the decoding hardware requests that the output decoded media information be allocated to the hardware protected memory such as the secure memory 1256 of a secure OS 1204 based on one or more policies associated with the media information. For example, the decoding hardware 1208 can detect a media type for the media information and responsive to the detection can request that the output surfaces be allocated in secure memory of the secure OS according to a policy for the media information. In some implementations, the ITA 1222 can tag the media type for the media information with a metadata flag indicating a level of output protection. In some implementations, the media decrypter 1224 can be loaded by the ITA 1222 and can use a secure channel to cause the decoding hardware to decode to protected memory. If the protections for the media information indicate that the decoded media information is to be decoded to secure memory of the secure OS and the decoding hardware does not allocate the output surfaces to the secure memory, decoding can be halted. In some implementations, the produced decoded media information 1282 can be allocated to software protected memory by the decoding hardware based on protection policies for the media information.

The protected application process 1214 can include one or more media processors such as the media processor 1230 for processing the media information after it has been decoded. The media processor 1230 can be any media processor described herein. The media processor 1230 can be a trusted component that is pluggable and loaded in the protected application process 1214 that can be given access to the decoded media information 1282 stored in the secure memory 1256.

In FIG. 12, at 1284, the decoded media information 1282 is retrieved by a media processor 1230 for processing. The media processor 1230 writes the processed media information 1286 into the secure memory 1256 to be stored. For example, the media processor 1230 can allocate the hardware protected memory and can write the output processed media information 1286 to the allocated memory.

A media processor can include one or more of a video processor, an audio processor, a media filter, a media transform, or the like. For example, the protected application process 1214 can have a video processor as the media processor component which can process (e.g., modify or change) decoded video information. The video processor can convert the color space and/or the size of the media information.

To maintain the security of the decoded media information 1282, when the media processor 1230 detects that the media information was received from secure memory 1256 of the secure OS 1204, the media processor 1230 can write the processed media information 1286 into the secure memory 1256 of the secure OS 1204, as shown at 1288. As a trusted component, the media processor 1230 can be given access, by the secure OS 1204, to the decoded media information 1282 stored in the secure memory 1256. The media processor 1230 can be provided the location of the decoded media information 1282 in the secure memory 1256 and access for reading and writing to the secure memory 1256.

After the media information is decoded and stored in the secure memory 1256, the media output trust authority 1234 can manage the outputting of the media information. The media output trust authority 1234 can be any media output trust authority (media OTA) described herein. The media OTA 1234 can manage the outputting of media information to one or more output devices based on policies for the media information. For example, the media OTA 1234 can enforce output protections associated with the media information that are set by a content source or provider in one or more policies. The media information being processed in the process of the application 1210 can have associated policies that indicate that the media information can be output to one or more authorized types of output devices. The media OTA 1234 can be set up for and/or connected to an authorized output device such as a monitor or other output device, and the media OTA 1234 can authorize the outputting of the media information to the authorized output device. If the output device is not an authorized output device the media OTA 1234 can prevent the media information from being output to the device and/or can enforce protections by causing the outputting of the media information to be obfuscated.

The media OTA 1234 receives the policies from the ITA 1222 loaded in the protected application process 1214. In some implementations, the media OTA 1234 can report to the ITA 1222 that the outputting of the media information complies with the policies received from the ITA 1222. In some implementations, the media OTA 1234 can indicate to a compositing component 1294 that the media information is authorized to be sent out to an output device such as the output device 1206. After being authorized by the media OTA 1234, the compositing component 1294 can output the media information to the output device 1206.

The media OTA 1234 provides output management information to a secure media output trust authority 1258. The secure media output trust authority 1258 can be any secure media output trust authority (secure media OTA) described herein. The secure media OTA 1258 can enforce output protections associated with the media information. For example, the secure media OTA 1258 can authorize the outputting of media information (e.g., video, audio, or other media information) in secure memory to trusted output devices and/or locations based on output policies set for the media information. In some implementations, the secure media OTA 1258 can evaluate and verify that the outputting authorized by the media OTA 1234 of the protected application process 1214 is in compliance with policies that were received from the content source. In some implementations, a secure media OTA can restrict the media information from being output to untrusted and/or unauthorized output devices. For example, the secure media OTA 1258 can prevent unauthorized and/or untrusted output devices from reading the media information from a secure memory of a secure OS. The secure media OTA 1258 can prevent unauthorized output devices from outputting the media information by obscuring the media information. For example, the media information can be scrambled, silenced, blacked out, or otherwise obscured. In some implementations, the secure media OTA 1258 can use a video overlay for enforcing output protections for the media information. For example, the video overlay can include a display element that can have access to and/or be allowed to read the media information from secure memory for displaying purposes but is restricted from using the media information for other purposes.

At 1290 in FIG. 12, the protection policies for the media information are passed securely from the media OTA 1234 to the secure media OTA 1258 as signed by the signed policy certificate 1240. For example, the digitally signed policy certificate 1240 can use encryption to sign a blob that includes the protection policies for the media information. The digitally signed blob including the policies can be securely sent from the ITA 1222 to the secure media OTA 1258 through the media OTA 1234. The ITA 1222 can receive the digitally signed blob from a content source or provider. The signed policy certificate 1240 and the policies are provided to the secure media output trust authority 1258 by the media output trust authority 1234 through a secure channel. The signed policy certificate 1240 can be checked to verify that its associated policies have not been changed or tampered with during transmission of the policies from the content source. In some implementations, if a signed policy certificate is checked and is not valid, the policies associated with the signed policy certificate can be determined to be compromised and/or unauthorized for use. In some implementations, the secure media OTA 1258 can decrypt the digitally signed blob to determine the policies set by the content providers for the media information. The digitally signed blob can use an encryption such as a heavy or light encryption to maintain the security of its information contents. In some implementations, if the signed policy certificate blob is not received, or if the signed policy certificate blob has been tampered with, the secure media OTA 1258 can determine that the media OTA 1234 is not complying with the output protections of the media information. In response to determining that the media OTA 1234 is not compliant, the secure media OTA 1258 can prevent the media information from being output to one or more output devices reported and/or authorized by the media OTA 1234.

The secure media OTA 1258 at least monitors that the media output trust authority 1234 is complying with the output policies for protecting the media information. For example, the secure media OTA 1258 can determine if the policies for protecting the media information are being followed by a media OTA 1234 at least by comparing the digitally signed policies with the output management information received from the media OTA. The output management information received by the secure media OTA 1258 can indicate information about which output devices the media OTA 1234 has authorized for outputting the media information. For example, the media OTA 1234 can pass information about which output devices and/or locations the media information is to be output to, and the secure media OTA 1258 can verify that the referenced output devices and/or locations are authorized for outputting the media information according to the signed protection policies.

In some implementations, to protect the decoded media information, the secure media OTA 1258 can monitor the number of output devices the media information is output to by one or more media output trust authorities. If the number of output devices does not comply with the policies for the media information, then the secure media OTA 1258 can prevent the outputting of the media information to one or more of the indicated output devices.

In some implementations, the secure media OTA 1258 can communicate with the secure decrypter 1250. The secure media OTA 1258 can receive keys or access to stored data in the secure memory 1256. Once received, the secure media OTA 1258 can provide the keys and/or access to stored data to authorized output devices and/or locations. For example, the secure media OTA 1258 can manage the outputting of media information using secure keys, gained from the secure decrypter, that allow access to the media information (e.g., surface information or the like) in the secure memory 1256.

Figure 13:
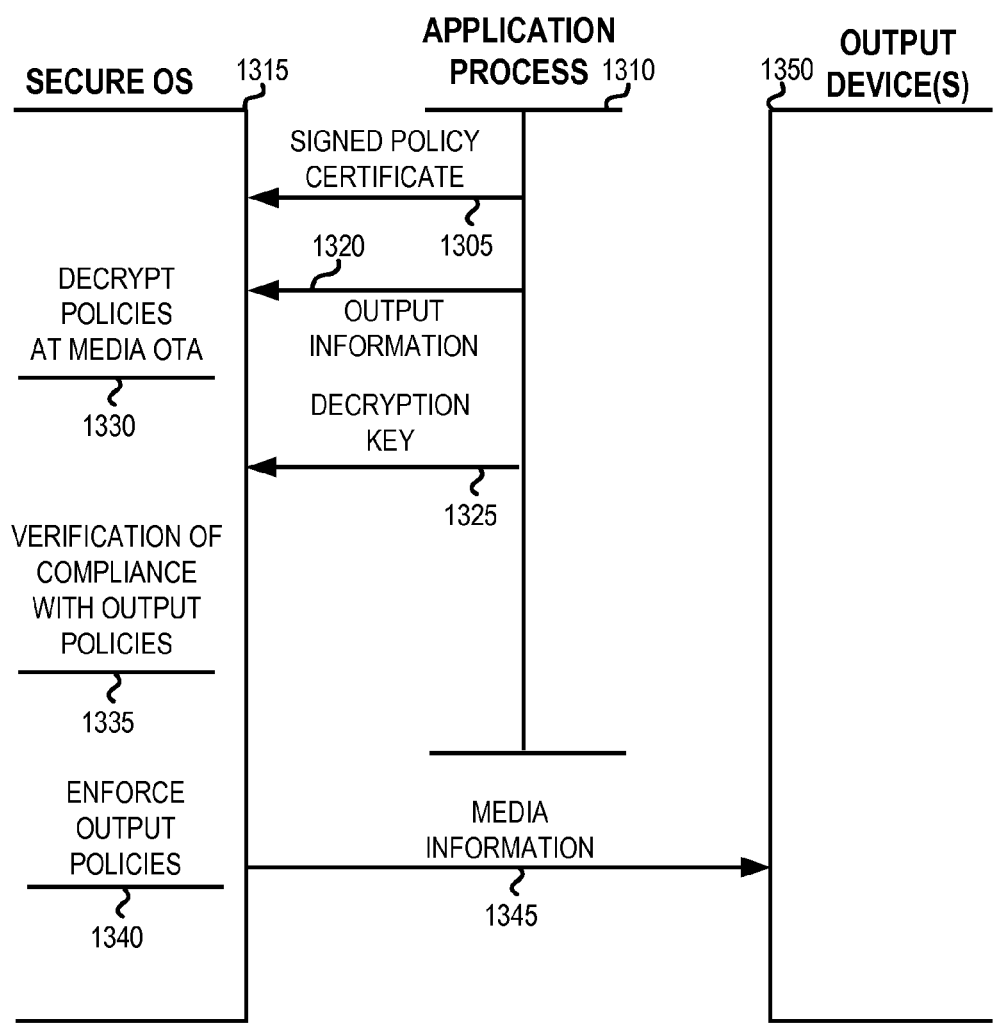
FIG. 13 is a diagram illustrating enforcement of protection policies for protecting media information using a secure operating system.

Exemplary Enforcement of Output Policies for Protecting Media Information Using a Secure Operating System FIG. 13 is a diagram illustrating enforcement of output policies for protecting media information using a secure OS. In FIG. 13, at 1305, an application process 1310 sends a signed policy certificate (and optionally encrypted encoded media information) to a secure OS 1315. At 1320, the application process 1310 sends output management information to the secure OS 1315. The output management information can include information about which output devices and/or locations a media OTA of the application process has authorized for outputting the decoded media information. At 1325, the application process 1310 sends a decryption key that is received at the secure OS 1315. At 1330, the decryption key is used by a secure OTA of the secure OS 1315 to decrypt the signed policy certificate for verification. At 1335, the secure media OTA of the secure OS 1315 compares the output management information against the output polices to determine if the media OTA of the application process 1310 is complying with the output policies of the media information. At 1340, the secure media OTA enforces the output policies based on the compliance check. For example, if the secure media OTA determines that the media OTA is complying with the output polices, the one or more output devices 1350 referenced by the output management information can be allowed access to the media information by the secure media OTA of the secure OS 1315 as shown at 1345. If the secure media OTA determines that the media OTA is not complying with the output polices, the output devices referenced by the output management information can be denied access to the media information by the secure media OTA of the secure OS 1315.

Exemplary Implementation Environment

Figure 14:
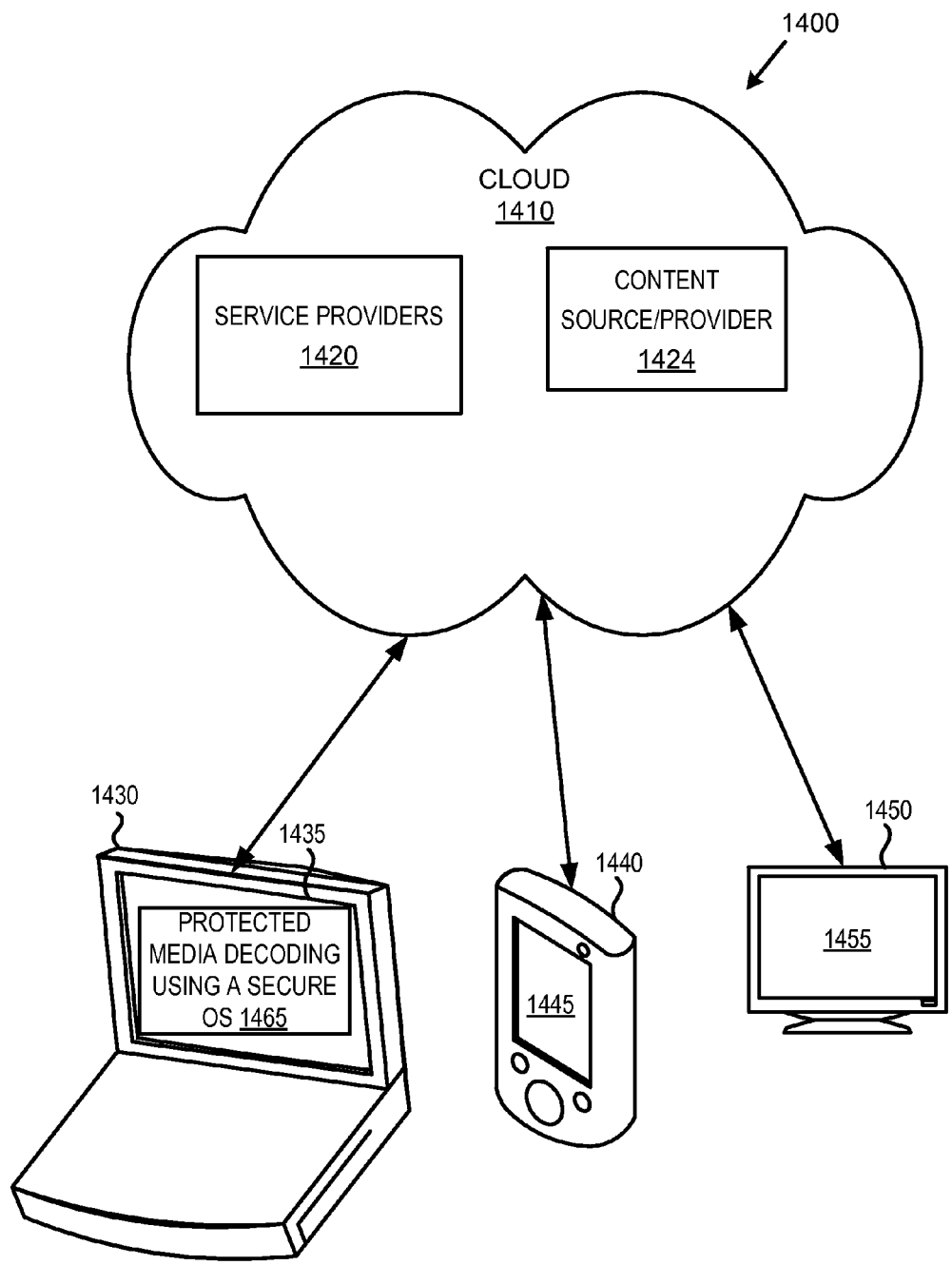
FIG. 14 is a schematic diagram illustrating a generalized example of a suitable implementation environment for at least some of the disclosed embodiments.

FIG. 14 illustrates a generalized example of a suitable implementation environment 1400 in which described embodiments, techniques, and technologies may be implemented.

In example environment 1400, various types of services (e.g., computing services) are provided by a cloud 1410. For example, the cloud 1410 can comprise a collection of computing devices, which may be located centrally or distributed, that provide cloud-based services to various types of users and devices connected via a network such as the Internet. The implementation environment 1400 can be used in different ways to accomplish computing tasks. For example, some tasks (e.g., processing user input and presenting a user interface) can be performed on local computing devices (e.g., connected devices 1430, 1440, 1450) while other tasks (e.g., storage of data to be used in subsequent processing) can be performed in the cloud 1410.

In example environment 1400, the cloud 1410 provides services for connected computing devices such as connected devices 1430, 1440, 1450 with a variety of screen capabilities. Connected device 1430 represents a device with a computer screen 1435 (e.g., a mid-size screen). For example, connected device 1430 could be a personal computer such as desktop computer, laptop, notebook, netbook, or the like. Connected device 1440 represents a device with a mobile device screen 1445 (e.g., a small size screen). For example, connected device 1440 can be a mobile phone, smart phone, personal digital assistant, tablet computer, or the like. Connected device 1450 represents a device with a large screen 1455. For example, connected device 1450 can be a television screen (e.g., a smart television) or another device connected to a television (e.g., a set-top box or gaming console) or the like. One or more of the connected devices 1430, 1440, and 1450 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1400. For example, the cloud 1410 can provide services for one or more computers (e.g., server computers) without displays.

Services can be provided by the cloud 1410 through service providers 1420, or through other providers of online services (not depicted). For example, cloud services can be customized to the screen size, display capability, and/or touchscreen capability of a particular connected device (e.g., connected devices 1430, 1440, 1450). Content can be provided by the cloud 1410 through one or more content source and/or providers 1424.

In example environment 1400, the cloud 1410 can provide one or more of the technologies and solutions described herein to the various connected devices 1430, 1440, 1450 using, at least in part, the service providers 1420. For example, the service providers 1420 can provide a centralized solution for various cloud-based services. The service providers 1420 can manage service subscriptions for users and/or devices (e.g., for the connected devices 1430, 1440, 1450 and/or their respective users). The cloud 1410 can provide one or more resources, for implementing one or more of the technologies described herein such as for facilitating decoding of protected media information using a secure OS, as shown at 1465.

Exemplary Computing Environment

Figure 15:
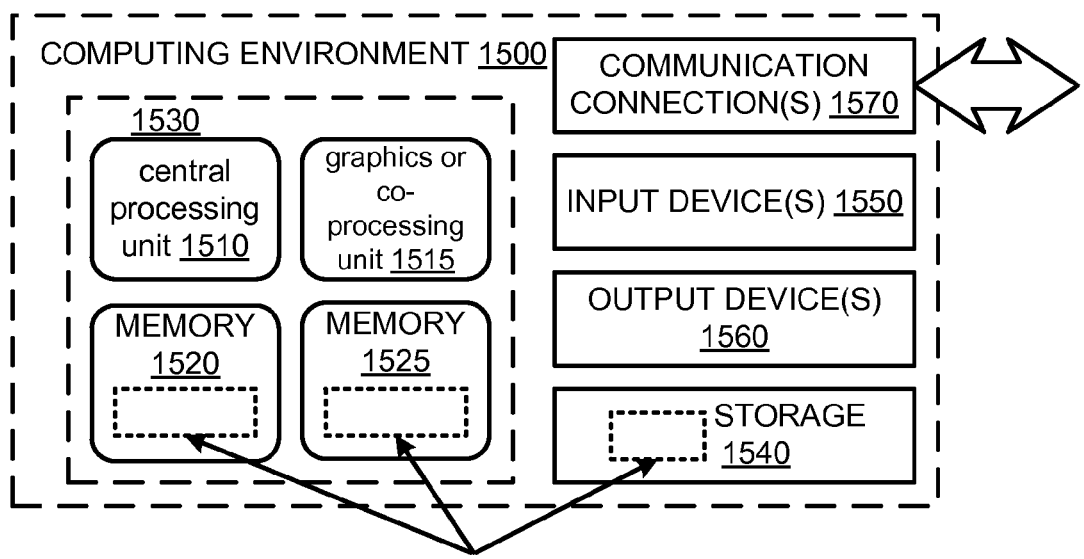
FIG. 15 is a schematic diagram illustrating a generalized example of a suitable computing environment for at least some of the disclosed embodiments.

FIG. 15 depicts a generalized example of a suitable computing environment 1500 in which the described innovations may be implemented. The computing environment 1500 is not intended to suggest any limitation as to scope of use or functionality, as the innovations may be implemented in diverse general-purpose or special-purpose computing systems. For example, the computing environment 1500 can be any of a variety of computing devices (e.g., desktop computer, laptop computer, server computer, tablet computer, media player, gaming system, mobile device, etc.)

With reference to FIG. 15, the computing environment 1500 includes one or more processing units 1510, 1515 and memory 1520, 1525. In FIG. 15, this basic configuration 1530 is included within a dashed line. The processing units 1510, 1515 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 15 shows a central processing unit 1510 as well as a graphics processing unit or co-processing unit 1515. The tangible memory 1520, 1525 may be volatile memory (e.g., registers, cache, RAM), nonvolatile memory (e.g., ROM, EEPROM, flash memory, etc.), or some combination of the two, accessible by the processing unit(s). The memory 1520, 1525 stores software 1580 implementing one or more technologies described herein such as for facilitating decoding of protected media information using a secure operating system, in the form of computer-executable instructions suitable for execution by the processing unit(s). In some implementations, the memory 1520 can include secure memory as described herein.

A computing system may have additional features. For example, the computing environment 1500 includes storage 1540, one or more input devices 1550, one or more output devices 1560, and one or more communication connections 1570. An interconnection mechanism (not shown) such as a bus, controller, or network interconnects the components of the computing environment 1500. Typically, one or more operating system software (not shown) implement one or more operating systems that can provide one or more operating environments for other software executing in the computing environment 1500, and coordinates activities of the components of the computing environment 1500. For example, an operating system can include a secure operating system as described herein.

The tangible storage 1540 may be removable or non-removable, and includes magnetic disks, magnetic tapes or cassettes, hard disks, solid-state storage such as solid state drives, or optical disks such as CD-ROMs or DVDs. The storage 1540 can store instructions for the software 1580 implementing one or more technologies described herein such as for facilitating decoding of protected media information using a secure operating system.

The input device(s) 1550 may be a touch input device such as a keyboard, mouse, pen, or trackball, a voice input device, a scanning device, or another device that provides input to the computing environment 1500. For video encoding, the input device(s) 1550 may be a camera, video card, TV tuner card, or similar device that accepts video input in analog or digital form, or a CD-ROM or CD-RW that reads video samples into the computing environment 1500. The output device(s) 1560 may be a display, printer, speaker, CD-writer, or another device that provides output from the computing environment 1500.

The communication connection(s) 1570 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., computer-readable media, such as one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). As should be readily understood, the term computer-readable storage media does not include communication media such as modulated data signals. Any of the computer-executable instructions for implementing the disclosed techniques as well as any data created and used during implementation of the disclosed embodiments can be stored on one or more computer-readable media (e.g., computer-readable storage media, which excludes propagated signals). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, C#, J++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionally described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims and their equivalents.

We claim:

1. A method comprising:
    at a secure process of a secure operating system of a computing system, receiving encoded media information that is encrypted;
    in the secure process, decrypting at least a portion of the encoded media information that is encrypted, the at least a portion of the encoded media information comprising header information;
    from the secure operating system, sending the header information to a software decoder for control of decompression of the encoded media information by decoding hardware; and
    securely providing the decoding hardware access to the encoded media information for the decompression of the encoded media information, the decompression being at least in part controlled according to one or more operation commands from the software decoder based on the header information from the secure operating system, to produce decoded media information.

2. The method of claim 1, wherein the decrypting at least the portion of the encoded media information comprises determining an amount of the encoded media information that includes the header information based at least in part on a cap amount of data or on an encoding format of the encoded media information.

3. The method of claim 1, wherein the sending the header information to the software decoder facilitates control of the decompression by the decoding hardware through the software decoder sending the one or more operation commands to the decoding hardware based on the header information.

4. The method of claim 1, further comprising storing the encoded media information that is encrypted in a secure memory of the secure operating system.

5. The method of claim 1, further comprising sending a media type associated with part of the encoded media information so as to specify output of the decoded media information to secure memory.

6. The method of claim 1 wherein the securely providing the decoding hardware access to the encoded media information comprises providing a decryption key to the decoding hardware for decryption of the encoded media information using the decryption key.

7. The method of claim 6, wherein the providing the decryption key to the decoding hardware comprises:
    establishing a secure channel to the decoding hardware from a secure decrypter included in the secure process of the secure operating system; and
    sending the decryption key from the secure decrypter to the decoding hardware through the secure channel.

8. The method of claim 6, wherein the securely providing the decryption key to the decoding hardware comprises:
    storing the decryption key in a secure key store; and
    providing the decoding hardware a decryption key index associated with the decryption key stored in the secure key store.

9. The method of claim 1, further comprising:
    receiving, at a secure decrypter included in the secure process, a decryption key; and
    storing, in secure memory, the encoded media information that is decrypted;
    wherein the decrypting at least the portion of the encoded media information that is encrypted comprises decrypting the encoded media information using the decryption key;
    wherein the securely providing the decoding hardware access to the encoded media information comprises providing the decoding hardware information that indicates where the encoded media information is stored in the secure memory.

10. The method of claim 1, further comprising, by a secure decrypter included in the secure process, determining a format for the encoded media information.

11. The method of claim 1, further comprising receiving a signed policy certificate associated with the encoded media information at the secure process of the secure operating system.

12. The method of claim 11, wherein the receiving the signed policy certificate comprises receiving the signed policy certificate at a secure media output trust authority included in the secure process, the method further comprising:
    based on the signed policy certificate, enforcing output protections for the decoded media information.

13. The method of claim 1, wherein the software decoder is included in a process for an application, and wherein the process for the application comprises a protected media process for the application.

14. The method of claim 1, wherein the encrypted media information is encrypted in a first encryption, the method further comprising:

encrypting the header information in a second encryption before the sending the header information to the software decoder.

15. The method of claim 1, wherein the header information includes one or more of a sequence parameter set, a picture parameter set, and a slice header for the encoded media information.

16. The method of claim 1, wherein the one or more operation commands allow the software decoder to control one or more of allocation of memory, management of memory, and ordering of frames during the decompression of the encoded media information by the decoding hardware.

17. A computing device comprising at least one processor and memory, the memory storing computer-executable instructions for causing the computing device to perform media processing comprising:
   at a secure process of a secure operating system, receiving a decryption key and encoded media information that is encrypted;
   by the secure process, decrypting, using the decryption key, header information included in the encoded media information that is encrypted;
   from the secure operating system, sending the header information to a software decoder for control of decompression of the encoded media information by decoding hardware, wherein the software decoder is included in a process for an application; and
   from the secure operating system, securely providing decoding hardware the decryption key to facilitate decryption of the encoded media information that is encrypted and the decompression of the decrypted encoded media information, the decompression being at least in part controlled according to one or more operation commands from the software decoder based on the header information from the secure operating system, to produce decoded media information.

18. The computing device of claim 17, wherein the sending the header information to the software decoder facilitates control of the decompression by the decoding hardware through the software decoder sending the one or more operation commands to the decoding hardware based on the header information, the one or more operation commands to be performed during the decompression of the encoded media information.

19. The computing device of claim 17, wherein the decryption key is a first decryption key and the media processing further comprises:
   by the secure process, re-encrypting the encoded media information, the re-encrypted encoded media information decryptable using a second decryption key.

20. The computing device of claim 17, wherein the securely providing the decoding hardware the decryption key comprises:
   establishing a secure channel to the decoding hardware from a secure decrypter included in the secure process of the secure operating system; and
   sending the decryption key from the secure decrypter to the decoding hardware using the secure channel.

21. The computing device of claim 17, further comprising:
   receiving a signed policy certificate at a media output trust authority included in the secure process; and
   based on the signed policy certificate, enforcing output protections for the decoded media information.

22. One or more computer-readable storage devices storing computer-executable instructions for causing a computing system, when programmed thereby, to perform media processing comprising:
   at a secure process of a secure operating system of the computing system, receiving encoded media information which is at least partially encrypted, the encoded media information comprising header information which is not encrypted;
   from the secure operating system, sending the header information to a software decoder for control of decompression of the encoded media information by decoding hardware; and
   securely providing the decoding hardware access to at least an encrypted portion of the encoded media information which is at least partially encrypted for the decompression of the encoded media information which is at least partially encrypted, the decompression being at least in part controlled according to one or more operation commands from the software decoder based on the header information from the secure operating system, to produce decoded media information.

23. A computing system comprising at least one processor and memory, the memory storing computer-executable instructions for causing the computing system to perform media processing comprising:
   at a secure process of a secure operating system of the computing system, receiving encoded media information that is encrypted;
   in the secure process, decrypting at least a portion of the encoded media information that is encrypted, the at least a portion of the encoded media information comprising header information;
   from the secure operating system, sending the header information to a software decoder for control of decompression of the encoded media information by decoding hardware; and
   securely providing the decoding hardware access to the encoded media information for the decompression of the encoded media information, the decompression being at least in part controlled according to one or more operation commands from the software decoder based on the header information from the secure operating system, to produce decoded media information.

24. The computing system of claim 23, wherein the decrypting at least the portion of the encoded media information comprises determining an amount of the encoded media information that includes the header information based at least in part on a cap amount of data or on an encoding format of the encoded media information.

25. The computing system of claim 23, wherein the media processing further comprises storing the encoded media information that is encrypted in a secure memory of the secure operating system.

26. The computing system of claim 23, wherein the securely providing the decoding hardware access to the encoded media information comprises providing a decryption key to the decoding hardware for decryption of the encoded media information using the decryption key.

27. The computing system of claim 23, wherein the media processing further comprises:
   receiving, at a secure decrypter included in the secure process, a decryption key; and
   storing, in secure memory, the encoded media information that is decrypted;
   wherein the decrypting at least the portion of the encoded media information that is encrypted comprises decrypting the encoded media information using the decryption key;
   wherein the securely providing the decoding hardware access to the encoded media information comprises providing the decoding hardware information that indicates where the encoded media information is stored in the secure memory.

28. The computing system of claim 23, wherein the media processing further comprises:
receiving, at a secure media output trust authority included in the secure process, a signed policy certificate associated with the encoded media information at the secure process of the secure operating system; and
based on the signed policy certificate, enforcing output protections for the decoded media information.

29. The computing system of claim 23, wherein the encrypted media information is encrypted in a first encryption, the media processing further comprising:
encrypting the header information in a second encryption before the sending the header information to the software decoder.

30. The computing system of claim 23, wherein the header information includes one or more of a sequence parameter set, a picture parameter set, and a slice header for the encoded media information.

31. The computing system of claim 23, wherein the one or more operation commands allow the software decoder to control one or more of allocation of memory, management of memory, and ordering of frames during the decompression of the encoded media information by the decoding hardware.

* * * * *